United States Patent
Leontaris et al.

(10) Patent No.: US 9,554,156 B2
(45) Date of Patent: Jan. 24, 2017

(54) METHOD AND SYSTEM FOR ILLUMINATION COMPENSATION AND TRANSITION FOR VIDEO CODING AND PROCESSING

(75) Inventors: Athanasios Leontaris, Mountain View, CA (US); Alexandros Tourapis, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 638 days.

(21) Appl. No.: 13/819,700

(22) PCT Filed: Sep. 1, 2011

(86) PCT No.: PCT/US2011/050188
§ 371 (c)(1),
(2), (4) Date: Feb. 27, 2013

(87) PCT Pub. No.: WO2012/031107
PCT Pub. Date: Mar. 8, 2012

(65) Prior Publication Data
US 2013/0163666 A1    Jun. 27, 2013

Related U.S. Application Data

(60) Provisional application No. 61/380,111, filed on Sep. 3, 2010.

(51) Int. Cl.
*H04N 19/105* (2014.01)
*H04N 19/87* (2014.01)
(Continued)

(52) U.S. Cl.
CPC ........ *H04N 19/87* (2014.11); *H04N 19/00569* (2013.01); *H04N 19/105* (2014.11);
(Continued)

(58) Field of Classification Search
CPC ...... H04N 19/142; H04N 19/87; H04N 5/147; H04N 19/186; G06T 9/004
See application file for complete search history.

(56) References Cited

U.S. PATENT DOCUMENTS

2005/0062756 A1*  3/2005  Dyke ................. G09G 5/02
                                                       345/604
2008/0089404 A1   4/2008  Okazaki
(Continued)

FOREIGN PATENT DOCUMENTS

CN    1902937     1/2007
CN    101212637   7/2008
(Continued)

OTHER PUBLICATIONS

Ford, A. et al. "Color Space Conversions" Aug. 1998.
(Continued)

*Primary Examiner* — Obafemi Sosanya

(57) ABSTRACT

Deriving illumination compensation parameters and detection of illumination dominant transitions types for video coding and processing applications is described. Illumination changes such as fade-ins, fade-outs, cross-fades, and flashes are detected. Detection of these illumination changes is then used for weighted prediction to provide for improved illumination compensation.

12 Claims, 11 Drawing Sheets

(51) Int. Cl.
*H04N 19/50* (2014.01)
*H04N 19/172* (2014.01)
*H04N 19/186* (2014.01)
*H04N 19/85* (2014.01)

(52) U.S. Cl.
CPC ......... *H04N 19/172* (2014.11); *H04N 19/186* (2014.11); *H04N 19/85* (2014.11)

(56) References Cited

U.S. PATENT DOCUMENTS

2009/0086814 A1* 4/2009 Leontaris ............. H04N 19/105
375/240.02
2013/0124951 A1* 5/2013 Shechtman ............. G06T 13/80
715/201

FOREIGN PATENT DOCUMENTS

| EP | 1359764 | 11/2003 |
|---|---|---|
| JP | 2007-306619 | 11/2007 |
| JP | 2011-507314 | 3/2011 |

OTHER PUBLICATIONS

Kamikura, K. et al. "Global Brightness-Variation Compensation for Video Coding", IEEE Transactions on Circuits and Systems for Video Technology, vol. 8, No. 8, Wavelet Applications in Industrial Processing, Dec. 1998, pp. 988-1000.

Kikuchi, Y. et al. "Interpolation Coefficient Adaptation in Multi-Frame Interpolative Prediction", Joint Video Team of ISO/IEC MPEG and ITU-T VCEG, JVT-C103, Mar. 2002.

Kato, H. et al. "Weighting Factor Determination Algorithm for H.264/MPEG-4 AVC Weighted Prediction", Proc. IEEE 6th Workshop on Multimedia Signal Proc., Siena, Italy, Oct. 2004.

Boyce, J.M. "Weighted Prediction in the H.264/MPEG-4 AVC Video Coding Standard" Proc. IEEE International Symposium on Circuits and Systems, Vancouver, Canada, May 2004, vol. 3, pp. 789-792.

Yin, P. et al. "Localized Weighted Prediction for Video Coding", Proc. IEEE International Symposium on Circuits and Systems, May 2005, vol. 5, pp. 4365-4368.

Zhang, R. et al. "Accurated Parameter Estimation and Efficient Fade Detection for Weighted Prediction in H.264 Video Compression" Image Processing 2008, 15th IEEE International Conference, IEEE, Piscataway, NJ, USA Oct. 12, 2008, p. 2837.

Kamisli, F. et al. "Estimation of Fade and Dissolve Parameters for Weighted Prediction in H.264/AVC" Image Processing, 2007, IEEE International Conference on IEEE, Sep. 1, 2007, pp. V-285.

Truong, Ba Tu et al. "New Enhancements to Cut, Fade, and Dissolve Detection Processes in Video Segmentation" Proc. of the Eight ACM International Conference on Multimedia, Jan. 1, 2000, pp. 219-227.

Nam J et al. "Detection of Gradual Transitions in Video Sequences Using B-Spline Interpolation", IEEE Transactions on Multimedia, Aug. 2005, vol. 7, No. 4, pp. 667-679.

* cited by examiner

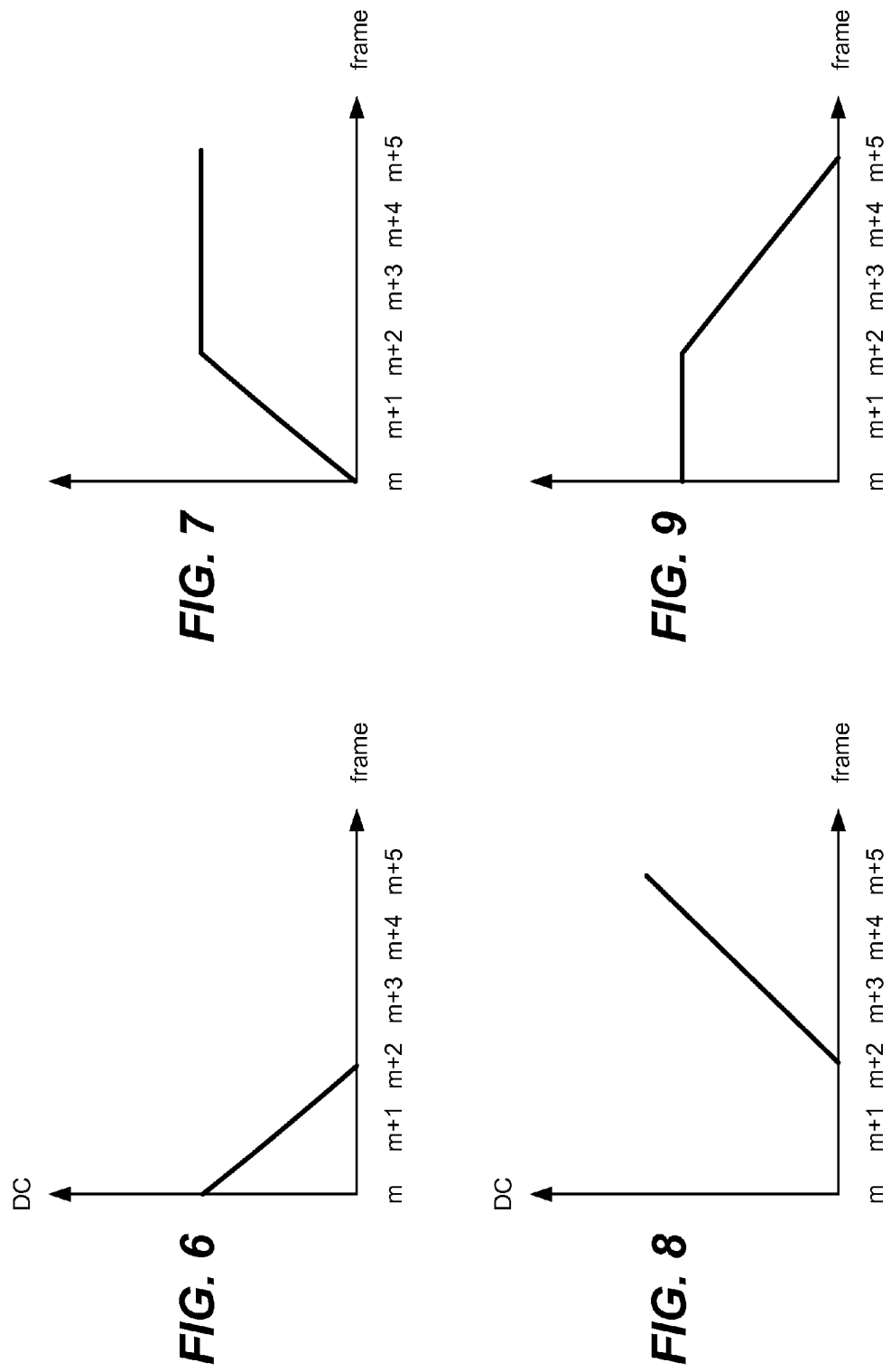

METHOD AND SYSTEM FOR ILLUMINATION COMPENSATION AND TRANSITION FOR VIDEO CODING AND PROCESSING

CROSS-REFERENCE TO RELATED APPLICATIONS

This application claims priority to U.S. Provisional Patent Application No. 61/380,111 filed 3 Sep. 2010, which is incorporated herein by reference in entirety for all purposes.

TECHNOLOGY

The present invention relates generally to image processing. More particularly, an embodiment of the present invention to deriving illumination compensation parameters and detecting illumination dominant transition types for video coding and processing.

BACKGROUND

Transitions from one picture to the next picture of a video signal are often characterized by either some motion in the new picture with reference to a previous picture that may have undergone a compression or processing operation, the appearance or disappearance of an object or part thereof, or the emergence of a new scene altogether that may render the previous coded, processed, or original picture less suitable for use as a prediction reference. Most of these events can be modeled using motion compensation (a special case of inter prediction) and intra-frame prediction. Motion compensation is used to predict samples in the current picture using samples in one or more previously coded pictures. More specifically, in block-based motion compensation, a block of samples in the current picture is predicted from a block of samples from some already decoded reference picture. The latter is known as a prediction block. A prediction block may be as simple as the collocated block in some previous coded picture, which corresponds to a motion vector of all-zeroes. To account for motion, however, a motion vector is transmitted that instructs the decoder to use some other, displaced, block that is a closer match to the block that is being predicted. The motion model can be as simple as translational, where the motion parameters consist of a horizontal and a vertical displacement motion vector, or as complex as the affine or perspective motion models that require 6 or 8 motion parameters. More complex motion compensation schemes may also yield prediction blocks that are combinations of multiple blocks that correspond to different motion parameters. However, video signals may also contain global or local illumination changes that cannot be effectively modeled by motion compensation (inter prediction) or intra prediction. These illumination changes are usually found as fades, cross-fades, flashes, and other local illumination changes, which may for example be caused by the presence of multiple lighting sources. Weighted prediction (WP), e.g., illumination compensation, can benefit prediction efficiency for fades, cross-fades, flashes, and other local illumination changes. Weighted prediction consists of weighting (multiplying) the color component samples, e.g. luma and/or chroma samples, with a gain, which is further augmented by adding an additional offset. Please note that within this disclosure, color parameters or color components may be used to refer to the individual components that comprise a color domain or space. Please also note that in some domains or spaces, the color components may comprise intensity related components and color related components. Intensity related components may comprise one or more of a luma value or a luminance value and color related components may comprise one or more of a chroma value or a chrominance value. State-of-the-art codecs, such as H.264/AVC, support weighted prediction of the samples that may be in one of many possible color spaces/domains. Weighted prediction is also useful for temporal pre- and post-filtering that can be used to reduce sensor noise, compression or other artifacts, and temporal flicker/inconsistencies, among others. In practice, the image processing operations responsible for the illumination change may not necessarily originate in the domain used to compress or process the image, e.g. the YCbCr domain. Intuition, supported by experimental findings, shows that these operations are usually conducted in some other domain, usually the sRGB domain (sRGB is a widely used RGB color space for PCs and digital cameras), which is also closer to the human perception notion of color information. Note that there is a multitude of possible YCbCr conversion formulas to and from the RGB color space. Also, the issue of the RGB values having been gamma corrected prior or after the operations that created the illumination changes must be accounted for. Apart from illumination changes that were created by processing (primarily fades and cross-fades), there are also illumination changes that are part of the content, such as global or local flashes, varying illumination from flashlights and light fixtures, and shifting natural lighting, among others.

Weighted prediction parameters, e.g. gain w and offset f, which are used for illumination compensation of sample s from sample p as $s = w \times p + f$ are derived through some kind of weighted prediction parameter search/estimation (WP search). In its most straightforward and highest complexity form, one may use a brute force search scheme that considers all possible combinations of gains and offsets within some constrained search window, similar to the brute force, full search scheme employed for motion estimation, compute the distortion/similarity of the illumination compensated reference signals compared to the source signals, and select the illumination compensation parameters that result in minimum distortion. Motion estimation and compensation may also be considered during such a search. Full search is however computationally intensive. A variety of weighted parameter estimation techniques have been proposed that estimate the "optimal" gain and offset for some given block, region, or even an entire frame (for global illumination compensation). See, for example, K. Kamikura, et al. "Global Brightness-Variation Compensation for Video Coding," IEEE Transactions on Circuits and Systems for Video Technology, vol. 8, no, 8, December 1998, pp. 988-1000, which describes a global brightness-variation compensation scheme to improve the coding efficiency for video scenes that contain global brightness variations caused by fade in/out, camera-iris adjustment, flicker, illumination change, etc. See also Y. Kikuchi and T. Chujoh, "Interpolation coefficient adaptation in multi-frame interpolative prediction", Joint Video Team of ISO/IEC MPEG and ITU-T VCEG, JVT-C103, March 2002 and H. Kato and Y. Nakajima, "Weighting factor determination algorithm for H.264/MPEG-4 AVC weighted prediction," *Proc. IEEE 6th Workshop on Multimedia Signal Proc.*, Siena, Italy, October 2004.

The methods, as described in the references discussed above, have to be applied separately to every color component for the best possible results. Weighted parameter search may benefit also from motion estimation and compensation.

See, for example, J. M. Boyce, "Weighted prediction in the H.264/MPEG-4 AVC video coding standard," Proc. IEEE International Symposium on Circuits and Systems, Vancouver, Canada, May 2004, vol. 3, pp. 789-792. In the H.264/ AVC standard, motion compensation of the samples is followed by application of weighted prediction to yield the final predicted samples. Hence, during WP search, there is interdependency between the motion vectors and the weighted parameters. This can be addressed by performing multiple iterations as follows: weighted parameters are initialized with some simple algorithm and are used to scale and offset the reference frame. The scaled and offset reference frame is then used for motion estimation that yields motion vectors. Alternatively, scaling and offsetting of the samples may be incorporated in the motion estimation step. In such an implementation, scale and offset are considered on-the-fly and there is no need for a discrete step that creates a weighted reference. In the second iteration these motion vectors are used during WP search so that for each MB the actual prediction reference block is used to derive the WP parameters. This is then again followed by generation of a scaled and offset reference frame that undergoes motion estimation or a single motion estimation step that considers the already derived scale and offset. Usually, these algorithms terminate if the WP parameters have converged.

As indicated above, methods known in the art for addressing illumination compensation may be computationally intensive, resulting in decreased performance for imagery display or increased hardware costs to provide desired performance. Note that even though the terms frame and picture may be used interchangeably, such interchangeable usage should not be interpreted to exclude interlace-scan content such as field pictures. The teachings of this disclosure are applicable both to progressively-scanned frames as well as interlace-scanned field (top or bottom) pictures.

BRIEF DESCRIPTION OF THE DRAWINGS

The accompanying drawings, which are incorporated into and constitute a part of this specification, illustrate one or more embodiments of the present disclosure and, together with the detailed description and the examples, serve to explain the principles and implementations of the disclosure.

FIG. 6 shows a diagram of an end of a fade, where DC is decreasing up to frame m+2.

FIG. 7 shows a diagram of an end of a fade, where DC is increasing up to frame m+2.

FIG. 8 shows a diagram of a start of a fade, where DC is increasing from frame m+2.

FIG. 9 shows a diagram of an end of a fade, where DC is decreasing from frame m+2.

DESCRIPTION OF EXAMPLE EMBODIMENTS

Figure 1:
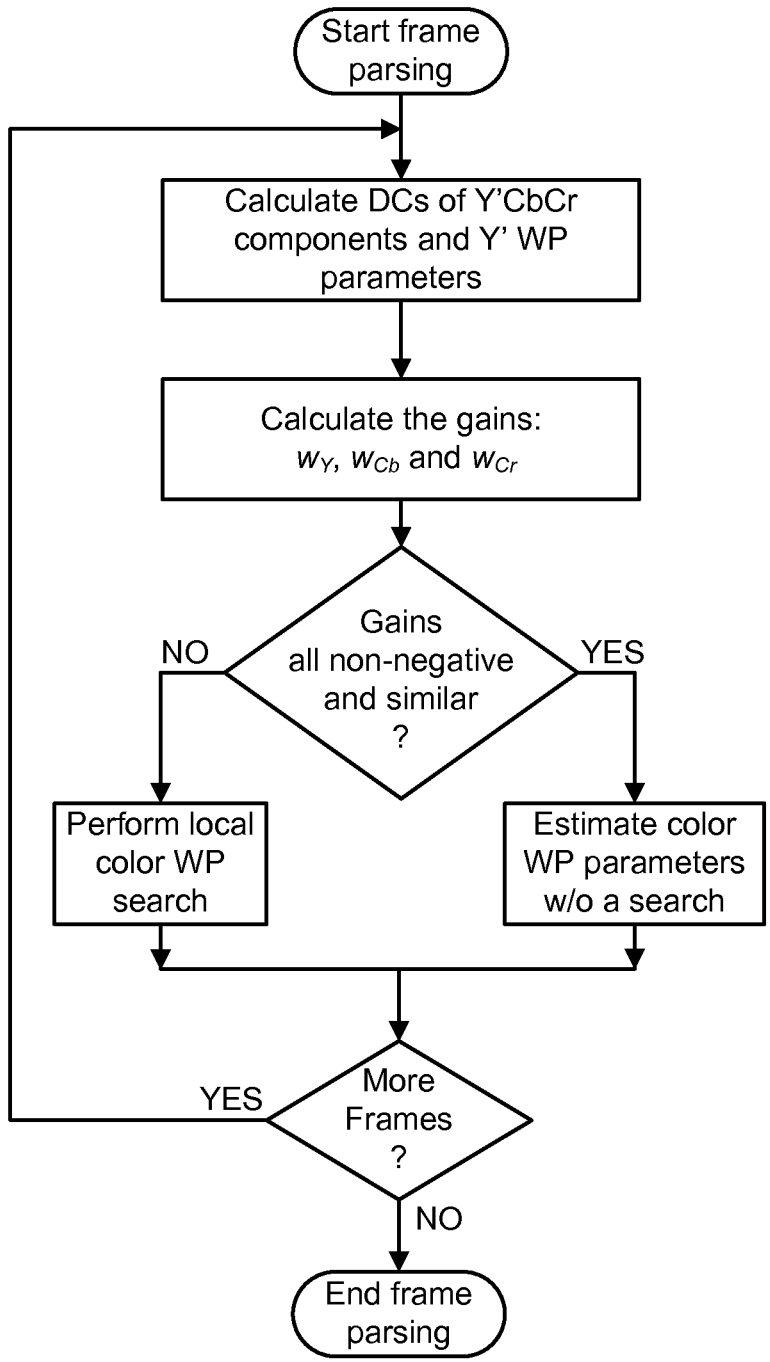
FIG. 1 shows a flowchart of an algorithm for determination of local or global illumination changes.

As provided in the examples described below, one embodiment of the invention is method for fade detection and determination of global or local nature of the fade in a transition from one picture to a next picture of a video signal, the method comprising: providing a plurality of frames of a picture and related prediction reference frames; for each frame and related prediction reference frame; calculating one or more intensity related values and one or more color related component values in a first color domain; for each frame and related prediction reference frame, calculating weighted prediction gains for each color component value in the first color domain; if the weighted prediction gains are all non-negative and substantially similar to each other, then determining that a global transition with zero offset is primarily occurring in a second color domain; and, if the weighted prediction gains are not all non-negative and substantially similar to each other, then determining that at least one of the following is not occurring: a global fading transition; a global fading transition with zero offset; or a global fading transition with zero offset in the second color domain.

As further provided in the examples described below, another embodiment of the invention is a method for fade detection and determination of global or local nature of the fade in a transition from one picture to a next picture of a video signal, the method comprising: providing a plurality of frames of a picture and related prediction reference frames; for each frame and related prediction reference frame; calculating intensity related and color related values in a first color domain; for each frame and related prediction reference frame; calculating intensity related weighted prediction parameters; for each frame and related prediction reference frame, calculating weighted prediction gains from computed (e.g., calculated) intensity related and color related values and from computed intensity related weighted prediction parameters; if the weighted prediction gains are all non-negative and substantially similar to each other, then determining that a global transition with zero offset is primarily occurring in a second color domain; and, if the weighted prediction gains are not all non-negative and substantially similar to each other, testing if a local transition is occurring.

Still another embodiment of the invention is a method for determination of global or local nature of a fade in a transition from a picture to a next picture of a video signal, the method comprising: providing a plurality of frames of the picture and related prediction reference frames; for each frame and related prediction reference frame, computing (e.g., calculating) intensity related and color related values in a first color domain; for each frame and related prediction reference frame, calculating weighted prediction gains for each intensity related and color related value in the first color domain; for each frame and related prediction reference frame, comparing the weighted prediction gains with each other; if the weighted prediction gains are all non-negative and substantially similar to each other, determining that the fade is global; and if the weighted prediction gains are not all non-negative and substantially similar to each other, determining that the fade is local.

Still another embodiment of the invention is a method for calculating second and third color component weighted prediction parameters from information about color space conversion and first color component weighted prediction parameters when an image transition occurs, the method comprising: calculating the first color component weighted prediction gain and offset; and based on values of the computed first color component weighted prediction gain and offset, calculating the second and third color component weighted prediction gains and offsets as functions of the color conversion offsets, coefficients of a color conversion matrix, and the first color component weighted prediction gain and offset.

Another embodiment is a method for calculating color related parameters from intensity related parameters and information about color space conversion when an image flash occurs, the method comprising: calculating intensity related gain and offset; if intensity related gain is not unity and intensity related offset is non-zero, then setting color related gains equal to intensity related gain and calculating color related offsets as functions of color format conversion offsets, intensity related gain, intensity related offset, and coefficients of color conversion matrix; if intensity related gain is not unity and intensity related offset is zero, then setting color related gains equal to the intensity related gain and calculating color related offsets as functions of color format conversion offsets, intensity related gain, and coefficients of color conversion matrix; and if intensity related gain is unity or close to unity, then setting color related gains equal to 1 and calculating color related offsets as functions of intensity related offset and coefficients of color conversion matrix.

Still another embodiment is a method for fade detection in a transition from one scene to a next scene of a video signal, the method comprising the following steps: Step A: providing a plurality of frames from the video signal; Step B: selecting a current frame of the plurality of frames; Step C: calculating a set of properties for one or more color space components of the current frame based on the frame values of one or more color components of frames preceding the current frame and frames following the current frame; Step D: calculating a set of properties for one or more color space components of a preceding frame preceding the current frame based on the frame values of one or more color components of frames preceding the preceding frame and frames following the preceding frame; and, Step E: comparing the set of properties for the one or more color space parameters of the current frame to the set of parameters properties for the one or more color space parameters of the preceding frame to determine whether the current frame is an end frame of a fade with an increasing or decreasing frame value or if the frame preceding the current frame is a start frame of fade with an increasing or decreasing frame value.

Still another embodiment is a method for crossfade detection comprising: providing a plurality of frames of a video sequence and related bi-directional prediction reference frames; and determining whether a cross fade is present based on average gains computed for color space components of a first color domain of a current frame and related bi-directional prediction reference frames and average gains computed for color space components of a second color domain of a current frame and related bi-directional prediction reference frames.

Still another embodiment is A method for weighted parameter determination in the presence of fade conditions, the method comprising the following steps: Step A: providing a plurality of frames of a picture and related prediction reference frames; Step B: selecting a color component; Step C: for each frame and related prediction reference frame, determining saturated partitions for the selected color component within the frame and its related prediction reference frame; Step D: for each frame and related prediction reference frame, determining if both frames share large areas with saturated values for the selected color component, if there are no shared large areas with saturated values, go to Step H; Step E: for each frame and related prediction reference frame, determining unsaturated partitions within the frame and its related prediction reference frame; Step F: for each frame and related prediction reference frame, determining if both frames share large areas with unsaturated values for the selected color component; if there are no shared large areas with unsaturated values go to Step H; Step G: for each frame and related prediction frame, calculating weighted prediction gains and factors based on the shared, and optionally normalized to the same pixel count, large areas with unsaturated values; and Step H: for each frame and related prediction reference frame, calculating weighted prediction gains and factors based on the entire frame.

Still another embodiment is a method for weighted parameter determination in the presence of fade conditions, the method comprising the following steps: Step A: providing a plurality of frames of a picture and related prediction reference frames containing color sample data; Step B: selecting a color component; Step C: for each frame, setting a current lowest saturation value and current highest saturation value for the selected color component based on a selected color domain for the color sample data; Step D: for each related prediction reference frame, setting a current reference lowest saturation value and a current reference highest saturation value for the selected color component based on the selected color domain for the color sample data; Step E: for each frame and related prediction reference frame, estimating weighted prediction parameters based on the current lowest saturation value, the current highest saturation value, the current reference lowest saturation value, and the current reference highest saturation value; Step F: for each related prediction reference frame, calculating an updated current reference lowest saturation value and an updated current reference highest saturation value based on estimated weighted prediction parameters; Step G: setting the current reference lowest saturation value equal to updated current reference lowest saturation value and setting the current reference highest saturation value equal to the updated current reference highest saturation value; Step H: repeating steps D through G for successive iterations if the weighted prediction parameters for a present iteration differ from the weighted prediction parameters for an immediately preceding iteration by a selected value or if a number of iterations are greater than a selected iteration count.

Still another embodiment of the invention is a method for estimating weighted predication gains and offsets in a fade transition from one picture to a next picture of a video signal, the method comprising: providing a current frame and a related prediction reference frame from pictures within the video signal; for each current frame and related prediction reference frame; calculating color component values in a color domain, wherein $A_m$ designates a first color component for the current frame, $B_m$ designates a second color component for the current frame, $C_m$ designates a third color component for the current frame, and wherein $A_{m+1}$ designates a first color component for the related prediction reference frame, $B_{m+1}$ designates a second color component for the related prediction reference frame, $C_{m+1}$ designates a third color component for the related prediction reference frame; setting weighted prediction gains equal for all color components, wherein w designates an equal value weighted prediction gain for all color components; setting weighted prediction offsets for two of the color components equal to each other, wherein $f_A$ designates an offset for the first color component and $f_C$ designates an equal value weighted prediction offset for two of the color components; and solving a formula for weighted prediction gain w and weighted prediction offsets $f_A$ and $f_C$.

Still another embodiment of the invention is a method for estimating weighted predication gains and offsets in a fade transition from one picture to a next picture of a video signal, the method comprising: providing a current frame and a related prediction reference frame from pictures within the video signal; for each current frame and related prediction reference frame; calculating color component values in a color domain, wherein $A_m$ designates a first color component for the current frame, $B_m$ designates a second color component for the current frame, $C_m$ designates a third color component for the current frame, and wherein $A_{m+1}$ designates a first color component for the related prediction reference frame, $B_{m+1}$ designates a second color component for the related prediction reference frame, $C_{m+1}$ designates a third color component for the related prediction reference frame; setting weighted prediction offsets equal for all color components, wherein f designates an equal value weighted prediction offset for all color components; setting weighted prediction gains for two of the color components equal to each other, wherein $w_A$ designates an offset for the first color component and $w_C$ designates an equal value weighted prediction offset for two of the color components; solving a formula for weighted prediction gains $w_A$ and $w_C$ and weighted prediction offset f:

Still another embodiment of the invention is a method for converting weighted prediction parameters from a first color domain to a second color domain, wherein a conversion from the first color domain to the second domain is not linear, the method comprising: calculating second color domain weighted prediction parameters for one or more frames in the second domain based on a conversion expression from the first color domain to the second color domain.

OVERVIEW

This disclosure describes methods and embodiments that relate to illumination compensation with color space considerations. Specifically, these methods and embodiments are directed at illumination compensation that may be incorporated into devices and software using video encoding and decoding for both 2-dimensional and 3-dimensional applications. Such devices may include video disc systems, over-the-air broadcast systems, Internet Protocol television (IPTV) systems, and other such devices.

The most widely used color space for video representation is the RGB color space. Each component represents the intensity of each color primary, in this case, the red, green, and blue primaries. The RGB domain is very efficient in terms of representing the color information. Furthermore, the RGB values are gamma-corrected prior to being sent to the display or the graphics card. The gamma correction operation can be generalized as shown in Eq. 1 below.

$$R' = \alpha_R \times R^{\gamma_R} + \beta_R$$

$$G' = \alpha_G \times G^{\gamma_G} + \beta_G$$

$$B' = \alpha_B \times B^{\gamma_B} + \beta_B \qquad \text{Eq. 1}$$

Parameters $\gamma_R$, $\gamma_G$, and $\gamma_B$ are the gamma correction exponents, while the gains $\alpha_R$, $\alpha_G$, and $\alpha_B$ control contrast and the offsets $\beta_R$, $\beta_G$, and $\beta_B$ control the black level and the intensity. For the remainder of this disclosure, it is assumed that $\alpha_R = \alpha_C = \alpha_B = 1$ and $\beta_R = \beta_G = \beta_B = 0$. Even though the gamma exponents can differ per component, for the remainder of this disclosure and for the purpose of simplifying notation and analysis $\gamma_R = \gamma_G = \gamma_B = \gamma$. However, it is to be understood that many of the methods described herein are applicable even in cases where the exponents differ. For basic and most practical applications, the gamma gain and the gamma offset are also assumed to be consistent across the color channels.

The RGB color space is efficient in terms of color representation and display, but is not usually efficient for video compression, as there may be significant correlation across the color channels. To improve the compression performance of television broadcast systems, several transforms have been proposed and standardized that decorrelate the RGB signals into a new color-space, where one component concentrates the luminance information and is often denoted as Y (Y' if gamma-corrected), and the remaining two components retain mostly chrominance information. These transforms include the analog American NTSC Y'I'Q' and the analog European EBU Y'U'V', as well the various digital flavors of Y'CbCr. See, for example, A. Ford and A. Roberts, "Color Space Conversions", available at http://www.poynton.com/PDFs/coloureq.pdf. Described below are the most widely-used versions of those transforms and issues that may arise from their application. Please note that the transforms and equations described below are presented for exemplary purposes and should not be interpreted as limiting the invention to the particular transforms and equations described. Those skilled in the art will understand other transforms and equations to be within the scope of the invention.

The international standard for coding of digital TV pictures at Standard Definition (SD) resolution is ITU BT.601. The non-linear coding matrices for conversion from the analog RGB space to the analog YCbCr space are shown in Eq. 2 below:

$$\begin{bmatrix} E'_Y \\ E'_{PB} \\ E'_{PR} \end{bmatrix} = \begin{bmatrix} 0.299 & 0.587 & 0.114 \\ -0.168736 & -0.331264 & 0.500 \\ 0.500 & -0.418688 & -0.081312 \end{bmatrix} \begin{bmatrix} E'_R \\ E'_G \\ E'_B \end{bmatrix} \qquad \text{Eq. 2}$$

Eq. 2 is valid for an RGB color channel representation that ranges from 0 to 1 ($(E'_R, E'_G, E'_B) \in [0,1]$) and yields the "analog" values of $E'_Y E'_{PB} E'_{PR}$ that take values: $E'_Y \in [0,1]$, $E'_{PB} \in [-0.5, 0.5]$, and $E'_{PR} \in [-0.5, 0.5]$. In digital computers, the RGB color components are usually represented with unsigned integer values of N bits, e.g., 8 bits, allowing values from 0 to 255. Let $(R', G', B') \in [0, 255]$. The conversion of the analog $E'_Y E'_{PB} E'_{PR}$ values to the digital Y'CbCr values (which is in essence a quantization process) can be accomplished according to ITU and SMPTE specifications with the transformation shown in Eq. 3 below:

$$Y' = 219 \times E'_Y + 16$$

$$Cb = 224 \times E'_{PB} + 128$$

$$Cr = 224 \times E'_{PR} + 128 \quad \text{Eq. 3}$$

Using Eq. 2 and Eq. 3, the 8-bit representation of the Y'CbCr components is derived as shown in Eq. 4 below:

$$\begin{bmatrix} Y' \\ Cb \\ Cr \end{bmatrix} = \begin{bmatrix} 65.481 & 128.553 & 24.966 \\ -37.797 & -74.203 & 112.0 \\ 112.0 & -93.786 & -18.214 \end{bmatrix} \begin{bmatrix} E'_R \\ E'_G \\ E'_B \end{bmatrix} + \begin{bmatrix} 16 \\ 128 \\ 128 \end{bmatrix} \quad \text{Eq. 4}$$

In an 8-bit digital representation, the RGB components range from 0 to 255. This dynamic range may be constrained when applying a transformation to the Y'CbCr space. Using the transformation of Eq. 5 shown below, the effective ranges become: Y'∈[16,235], Cb∈[16,240], and Cr∈[16,240].

$$\begin{bmatrix} Y' \\ Cb \\ Cr \end{bmatrix} = \begin{bmatrix} 0.257 & 0.504 & 0.098 \\ -0.148 & -0.291 & 0.439 \\ 0.439 & -0.368 & -0.071 \end{bmatrix} \begin{bmatrix} R' \\ G' \\ B' \end{bmatrix} + \begin{bmatrix} 16 \\ 128 \\ 128 \end{bmatrix} \quad \text{Eq. 5}$$

The expression shown in Eq. 5 may be further simplified to enable quick computation with integer-only SIMD operations as shown in Eq. 6:

$$Y' = \left\lfloor \frac{66 \times R' + 129 \times G' + 25 \times B' + 128}{256} \right\rfloor + 16 \quad \text{Eq. 6}$$

$$Cb = \left\lfloor \frac{-38 \times R' - 74 \times G' + 112 \times B' + 128}{256} \right\rfloor + 128$$

$$Cr = \left\lfloor \frac{112 \times R' - 94 \times G' - 18 \times B' + 128}{256} \right\rfloor + 128$$

The derivations of Eq. 5 and Eq. 6 use an offset of 16 for the luma component. Apart from Eq. 3 that is recommended by the ITU and SMPTE, the JPEG group's JFIF standard has standardized an alternative equation for analog-to-digital conversion, mainly for image compression where it is desirable to retain a larger slice of the dynamic range. This alternative equation is shown in Eq. 7 below:

$$Y' = 256 \times E'_Y$$

$$Cb = 256 \times E'_{PB} + 128$$

$$Cr = 256 \times E'_{PR} + 128 \quad \text{Eq. 7}$$

The conversion shown in Eq. 7 retains more of the dynamic range of the original analog signal. Furthermore, the luma values are no longer constrained to be larger or equal to 16 and lesser than 235. The chroma values also have a higher dynamic range. However, note also the absence of the offset for the Y' value. Note here that one should not limit this analysis and the methods of this invention to color space components sampled at 8 bits. Higher bit-depth content is and has been available for applications such as digital cinema, among others. In those cases the offsets, for example, of the transforms are scaled to the appropriate bit-depth. In addition, it is not necessary that the transformed color space retains the same dynamic range as the original color space. Last, the dynamic range (or bit-depth) may differ on a component basis.

The international standard for coding of digital TV pictures at High Definition (HD) resolution is ITU BT.709. The non-linear coding matrices are shown in Eq. 8 below:

$$\begin{bmatrix} E'_Y \\ E'_{PB} \\ E'_{PR} \end{bmatrix} = \begin{bmatrix} 0.2215 & 0.7154 & 0.0721 \\ -0.1145 & -0.3855 & 0.500 \\ 0.5016 & -0.4556 & -0.0459 \end{bmatrix} \begin{bmatrix} E'_R \\ E'_G \\ E'_B \end{bmatrix} \quad \text{Eq. 8}$$

The formula shown in Eq. 8 is valid for an RGB color channel representation that ranges from 0 to 1 ((E'$_R$, E'$_G$, E'$_B$)∈[0,1]) and yields the "analog" values of E'$_Y$, E'$_{PB}$, and E'$_{PR}$ that take values: E'$_Y$∈[0,1], E'$_{PB}$∈[−0.5,0.5], and E'$_{PR}$∈[−0.5,0.5].

Using Eq. 5 as the basis, the RGB to Y'CbCr conversion can be generalized as shown in Eq. 9 below:

$$\begin{bmatrix} Y' \\ Cb \\ Cr \end{bmatrix} = \begin{bmatrix} c_{00} & c_{01} & c_{02} \\ c_{10} & c_{11} & c_{12} \\ c_{20} & c_{21} & c_{22} \end{bmatrix} \begin{bmatrix} R' \\ G' \\ B' \end{bmatrix} + \begin{bmatrix} d_0 \\ d_1 \\ d_2 \end{bmatrix} \quad \text{Eq. 9}$$

The above expression is useful in modeling illumination changes. Please note that unless indicated otherwise, Y'CbCr and RGB refer to the gamma-corrected values. When, though RGB is used in the same equation or context with R'G'B', then the former notation denotes linear values while the latter notation denotes gamma-corrected values.

With the description of the RGB to Y'CbCr conversion provided above, the illumination changes addressed by some embodiments of the present invention may be categorized as described below.

A fade-in is a global illumination change that starts from a frame devoid of content (usually blank or of a single color) and ends with the start of a new scene. If the starting color is black, e.g. Y' values lesser than 17 and Cb, Cr values close to 128 for an 8-bit ITU BT.601 color space, then there is a fade-in from black, and if the starting frame color is white, e.g. Y' values greater than 234 and Cb, Cr values close to 128 for an 8-bit ITU BT.601 color space, then there is a fade-in from white. Frames between the start and the end frames (edge frames) can be modeled as linear combinations of the two edge frames. Fade-ins though can also be predicted from a single-direction: depending on the starting frame being light or dark, the frame prior to the last one, will be either a lighter or a darker version of the end frame. Let DC of a set denote the mean value of a set. Let the first frame be frame n and the last frame be frame n+N. Let Y'$_n$ denote the luma DC for frame n. Cb$_n$, Cr$_n$, R$_n$, G$_n$, and B$_n$ can be similarly defined. The global illumination change is modeled as a transition with a gain $w_{cmp}$ and an offset $f_{cmp}$ for each color space component cmp. For a fade-in, the expressions shown in Eq. 10 and Eq. 11 may be used:

$$Y'_m = w_Y \times Y'_{m+k} + f_Y$$

$$Cb_m = w_{Cb} \times Cb_{m+k} + f_{Cb}$$

$$Cr_m = w_{Cr} \times Cr_{m+k} + f_{Cr} \quad \text{Eq. 10}$$

$$R_m = w_R \times R_{m+k} + f_R$$

$$G_m = w_G \times G_{m+k} + f_G$$

$$B_m = w_B \times B_{m+k} + f_B \quad \text{Eq. 11}$$

The term k is defined as k≥1 and k≤−1 (any non-zero integer). A model for fade-ins based on Eq. 11 is shown in Eq. 12 below:

$$\begin{bmatrix} R_m \\ G_m \\ B_m \end{bmatrix} = w \times \begin{bmatrix} R_{m+k} \\ G_{m+k} \\ B_{m+k} \end{bmatrix} + \begin{bmatrix} f_R \\ f_G \\ f_B \end{bmatrix} \quad \text{Eq. 12}$$

From Eq., 12, it can be assumed that a single gain w can model the change in the RGB color space. The offsets f are often assumed to be zero. Note that the modeling of fade-ins as in Eq. 10 corresponds to weighted prediction with an offset and a gain as implemented in, e.g., the H.264 video coding standard. Let p denote a sample in the prediction block, and f denote the final predicted value. Let also $w_x$ denote the gain, $o_x$ denote the offset, and log WD denote a term that controls the mathematical precision of the operations. Weighted prediction may be implemented as shown in Eq. 13 below:

$$f = \begin{cases} ((p \times w_x + 2^{\log WD - 1}) >> \log WD) + o_x, & \log WD \geq 1 \\ (p \times w_x + o_x), & \text{otherwise} \end{cases} \quad \text{Eq. 13}$$

A fade-out is a global illumination change that starts from a frame that is the end of a scene and ends with a frame that is devoid of content (usually blank or of a single color). If the ending color is black then there is a fade-out to black, and if the ending frame color is white then there is a fade-out to white. Frames between the start and the end frames (edge frames) can be modeled as linear combinations of the two edge frames. Fade-outs, though, can also be predicted from a single-direction: depending on the ending frame being light or dark, the frame prior to the last one, will be either a darker or a lighter version of the end frame.

A cross-fade is a global illumination change where the start frame is a frame that belongs to one scene and the end frame is a frame that belongs to the next scene. Frames between the start and the end frames (edge frames) can be modeled as linear combinations of the two edge frames. However, unlike fade-ins and fade-outs, cross-fades cannot be efficiently predicted from a single direction. The reason is that a frame in a cross-fade is by definition a mixture of two frames that belong to two very different scenes. This mixture, linear in most cases, usually takes place in the RGB color space and may be modeled as a weighted average of two samples from each prediction direction. Eq. 14 below shows a model that may be used for cross-fades:

$$\begin{bmatrix} R_m \\ G_m \\ B_m \end{bmatrix} = w_1 \times \begin{bmatrix} R_{m+p} \\ G_{m+p} \\ B_{m+p} \end{bmatrix} + w_2 \times \begin{bmatrix} R_{m+q} \\ G_{m+q} \\ B_{m+q} \end{bmatrix} + \begin{bmatrix} f_R \\ f_G \\ f_B \end{bmatrix} \quad \text{Eq. 14}$$

It is assumed that the sum of the gains equals unity: $w_1 + w_2 = 1$. Furthermore, the offsets f are often assumed to be zero. Parameter p is defined as equal to or smaller than −1, e.g., p≤−1, while parameter q is defined as equal to or greater than 1, e.g., q≥1.

Flashes and miscellaneous illumination changes are illumination changes that do not fit any of the prior categories, such as fades and cross-fades that are most often artificial (synthetic) illumination changes imposed through image processing operations. Flashes are mostly naturally occurring illumination changes, while miscellaneous illumination changes can be of the artificial type (e.g., introduced during post-processing) and of the natural type. Note though that it is difficult to differentiate between artificial and natural types when considering computer animated content. The duration of these illumination changes varies, and often can be as short as a single frame, as in the case of a flash. Furthermore, they often affect a single part of the picture and cannot easily be modeled by global illumination compensation (global weighted prediction parameters). An additional complicating factor is that their behavior is content- and light source-dependent and not often amenable to constrained modeling. For example, it may be challenging to establish relationships between the changes across the color space components. Information about the light source's nature and the distance of the object from the sensor could assist with establishing these relationships. If, for example, the light source is of a particular color, e.g. red, the components that retain the red color information will be more impacted than those affecting other colors. In contrast, for fades and cross-fades some intuitive assumptions can be made that can provide the basis of illumination compensation algorithms. Described below are some examples of miscellaneous illumination changes and flashes.

Miscellaneous illumination changes can be synthetic or natural. Synthetic changes include the local counterparts of fade-in/out and cross-fades. For example, in a news show, localized illumination changes can be quite common, e.g. due to a logo or picture in picture segment insertion, among others. Numerous natural illumination changes may also affect a scene: (a) moving and/or shifting (in intensity or even color temperature) interior light sources (e.g. lamp), (b) moving or again shifting (e.g., sun moving through clouds) exterior light sources (sun setting, spotlights, etc.), (c) the presence of multiple sources that affect the object simultaneously, (d) reflections onto the camera or the object from the light source, (e) shading of the object from some other perhaps moving object that occludes the light source or from movement of the light source itself, (f) highly dynamic events such as an explosion that would result to multiple light sources that are also affect certain colors, (g) the presence of transparent and moving substances, such as water, that affect the direction and intensity of light coming from a light source both temporally and spatially, among others. Depending on the intensity of the light, color information may be preserved, though there will be cases where this will not be true.

Flashes last for a few frames, often just one, and involve local or global illumination changes. The weights and offsets on the color components, e.g. the RGB color space, are not necessarily correlated. If the light source was white, then all weights can be modeled as having approximately the same value. However, it is also possible that the light source has a dominant color. Furthermore, even if the flash source is white, it can enhance the color saturation, since low light tends to wash away all the color information in a scene. A similar argument though holds for very bright light that has a similar effect. Hence, during flashes, the notion that color information is maintained, as is more or less true with fades, does not necessarily hold.

Localized, moving, and directed light sources, such as flash-lights, cause local illumination changes, and can often saturate colors or alter the color component since they reveal color information that was not present in the previous frames. Hence, color information is not necessarily maintained.

This disclosure describes several embodiments according to the present invention that relate to illumination compensation with color space considerations. Note that the presentation of examples using specific color spaces should not be interpreted as limiting embodiments of the invention to those color spaces. Specifically, the description of embodiments using color spaces utilizing luma and chroma components are presented for descriptive purposes and those skilled in the art understand that such examples may be extended to other color spaces. Embodiments of the invention and examples thereof are briefly described below and are presented in additional detail as indicated by the section headings shown below.

One embodiment comprises a method for fade detection and determination of the nature of the illumination change: whether it is local or global. This method is also useful to guide the operation of the embodiment described in the next paragraph. This method requires some global parameters such as luma and chroma DC values, or histogram modes, among others, and exploits the relationships in different color spaces (RGB vs. YCbCr) to establish whether there is a fade and if it is local or global.

Another embodiment comprises a method for derivation of missing chroma parameters for illumination compensation given the luma parameters and color space conversion information. If luma parameters are known on a local basis (blocks or regions) then the method allows derivation of chroma parameters also on a local basis, regardless of the fact that the chroma a priori information is constrained to be limited and global in scope. This method allows the local and global illumination compensation parameters to be obtained for both luma and chroma components without necessarily resorting to full search in all of the components. Different embodiments are described below for each type of illumination change. An additional embodiment may implement this method as part of a video decoding system. Other embodiments may enhance chroma parameter estimation by considering segmentation when deriving the local parameters. Segmentation may benefit from motion compensation and is useful in tracking objects in the scene that share similar chroma information. Chroma parameters can thus benefit from some initialization values that improve the chances of deriving the correct missing chroma parameters and speed up the process of doing so.

Still another embodiment comprises a method for illumination compensation parameter derivation for cases where illumination changes take place in a color space representation other than the representation (domain) used during compression, which may include cases where the conversion matrices/equations are not linear. One goal is to determine parameters in one domain given knowledge about the values or characteristics of the parameters in some other domain. For example, it is possible that fades and cross-fades were generated by processing samples directly in the linear-domain or gamma-domain 4:4:4 RGB color space, while prediction followed by compression takes place, e.g., in the gamma-domain or log-domain 4:2:0 YCbCr color space. This may be extended to applications involving the XYZ color space, wide color gamut (WCG) spaces, or any other combination of existing or future color spaces. Similar issues may arise in scalable video coding where one layer (the base; BL) contains content in one color space, e.g., the low dynamic range (LDR) version of the frame, and the enhancement layer (EL) contains the content in a different color space, e.g. visual dynamic range (VDR) version of the frame. Another application of this embodiment deals with pairs of stereoscopic images. In a stereoscopic camera pair, each camera may have different color space characteristics, which may be a result of inadequate calibration but is also a result of the fact that no two lenses or camera sensors will have identical frequency transfer characteristics. As a result, images captured with each camera may display color shifts. Hence, illumination compensation parameters derived for one image may not be directly applicable to the other. Given, however, knowledge (through calibration) of the transform that relates color space coordinates from one camera to the other, one may apply this embodiment to derive parameters for the second image. This embodiment could thus be applied in scalable coding system where the BL codes the first image and the EL the second of the stereoscopic image pair. A method for optimizing parameter derivation for these and similar cases is described in additional detail below.

Still another embodiment comprises fade and cross-fade detection using illumination change relationships. Low complexity methods that can be used to demarcate fade sequences using parameters extracted during the search for illumination compensation parameters are described in additional detail below.

Another embodiment comprises illumination compensation parameter derivation with clipping and saturation compensation. Methods that account for the fact that samples in the luma and chroma components are clipped and saturated to pre-determined values are described below. Operations such as clipping and saturation break many of the standard assumptions that allow weighted prediction to work as intended. The basis of these methods is the categorization of samples into those that are away from the bounds and those that are close to those bounds. Additional embodiments are also defined that make use of segmentation and motion compensation to improve the tracking and derivation of the above regions/categories.

Other embodiments comprise methods for low complexity estimation of illumination compensation parameters.

Method for Fade Detection and Determination of the Nature of the Fade (Global or Local).

Modern codecs, such as H.264/AVC, usually operate in the Y'CbCr domain due to its very good decorielating properties. Note though that for the case of H.264/AVC, the input and decoded pictures may be in either of the following color spaces: Y-only (grayscale), Y'CbCr or YCgCo, RGB, and other unspecified monochrome or tri-stimulus color spaces (for example, YZX, also known as XYZ). Nevertheless, prior to display, the decompressed video is usually converted back to the source RGB domain. The RGB domain is closer to the operation of the human visual system, and fading transitions can be better understood if studied in this domain as described above. Post-production software, which is often used to create artificial fades, is likely to operate on the RGB domain. Note that for this disclosure, RGB and YCbCr are used for example embodiments. However, the methods disclosed herein can be applied for any given color space combination (e.g. XYZ vs. YCgCo) as long as the conversion matrices/algorithms are known. Note that to simplify notation, the term YCbCr will be used instead of Y'CbCr for the remainder of this disclosure.

During a fading transition, it is assumed that color information is preserved while illumination changes. This results in a common gain w for all components and is a result of Grassman's Second Law of Color Mixture. Eq. 12 can be further simplified by assuming that the (small) offsets are uniform across all components as shown in Eq. 15 below:

$$\begin{bmatrix} R_m \\ G_m \\ B_m \end{bmatrix} = w \times \begin{bmatrix} R_{m+k} \\ G_{m+k} \\ B_{m+k} \end{bmatrix} + f \times \begin{bmatrix} 1 \\ 1 \\ 1 \end{bmatrix} \qquad \text{Eq. 15}$$

Let ($Y'_m$, $Cb_m$, $Cr_m$) denote the Y'CbCr components for frame m. Eq. 16 below is derived by combining Eq. 15 and Eq. 9:

$$\begin{bmatrix} Y'_m \\ Cb_m \\ Cr_m \end{bmatrix} = w \times \begin{bmatrix} Y'_{m+k} \\ Cb_{m+k} \\ Cr_{m+k} \end{bmatrix} + \begin{bmatrix} c_{00} & c_{01} & c_{02} \\ c_{10} & c_{11} & c_{12} \\ c_{20} & c_{21} & c_{22} \end{bmatrix} \times \begin{bmatrix} f \\ f \\ f \end{bmatrix} + (1-w) \times \begin{bmatrix} d_0 \\ d_1 \\ d_2 \end{bmatrix} \qquad \text{Eq. 16}$$

For the widely-used ITU BT.601 RGB to Y'CbCr conversion matrices, the Eq. 16 can be simplified to Eq. 17 as shown below:

$$\begin{bmatrix} Y'_m \\ Cb_m \\ Cr_m \end{bmatrix} = w \times \begin{bmatrix} Y'_{m+k} \\ Cb_{m+k} \\ Cr_{m+k} \end{bmatrix} + \begin{bmatrix} f \\ 0 \\ 0 \end{bmatrix} + (1-w) \times \begin{bmatrix} d_0 \\ d_1 \\ d_2 \end{bmatrix} \qquad \text{Eq. 17}$$

Eq. 17 above is quite intuitive as it shows that a uniform offset in all components of the RGB domain is translated to a single offset for the Y (luma) component in the Y'CbCr domain. Furthermore, depending on how the analog values are quantized into their digital equivalents, two cases may be obtained. One case, where the ITU/SMPTE analog-to-digital conversion (Eq. 3) is used, is represented by Eq. 18 below:

$$\begin{bmatrix} Y'_m \\ Cb_m \\ Cr_m \end{bmatrix} = w \times \begin{bmatrix} Y'_{m+k} \\ Cb_{m+k} \\ Cr_{m+k} \end{bmatrix} + \begin{bmatrix} f \\ 0 \\ 0 \end{bmatrix} + (1-w) \times \begin{bmatrix} 16 \\ 128 \\ 128 \end{bmatrix} \qquad \text{Eq. 18}$$

Another case, where the JPEG's JFIF analog-to-digital conversion (Eq. 7) is used, is shown in Eq. 19 below:

$$\begin{bmatrix} Y'_m \\ Cb_m \\ Cr_m \end{bmatrix} = w \times \begin{bmatrix} Y'_{m+k} \\ Cb_{m+k} \\ Cr_{m+k} \end{bmatrix} + \begin{bmatrix} f \\ 0 \\ 0 \end{bmatrix} + (1-w) \times \begin{bmatrix} 0 \\ 128 \\ 128 \end{bmatrix} \qquad \text{Eq. 19}$$

The above expressions will give rise to algorithms (further described below) that translate gains and offsets for the Y component to weights and offsets for the Cb and Cr components. Certain aspects may help gather more information about the underlying fade, such as its classification as local or global, without resorting to time-consuming weighted prediction search. Assuming that f=0, the operations represented in Eq. 17 can be expanded to obtain the following expression shown in Eq. 20 below:

$$Y'_m = w \times Y'_{m+k} + (1-w) \times d_0 \Leftrightarrow Y'_m - d_0 = w \times (Y'_{m+k} - d_0)$$

$$Cb_m = w \times Cb_{m+k} + (1-w) \times d_1 \Leftrightarrow Cb_m - d_1 = w \times (Cb_{m+k} - d_1)$$

$$Cr_m = w \times Cr_{m+k} + (1-w) \times d_2 \Leftrightarrow Cr_m - d_2 = w \times (Cr_{m+k} - d_2) \qquad \text{Eq. 20}$$

Assuming that the per-component gains may not be equal, Eq. 21 is obtained as shown below:

$$w_Y = \frac{Y'_m - d_0}{Y'_{m+k} - d_0}, \; w_{Cb} = \frac{Cb_m - d_1}{Cb_{m+k} - d_1}, \; w_{Cr} = \frac{Cr_m - d_2}{Cr_{m+k} - d_2} \qquad \text{Eq. 21}$$

In some embodiments, term $d_0$ is either 0 or 16, while for most practical purposes, terms $d_1$ and $d_2$ are equal to 128. These terms take different values when considering content with higher bit depths than 8. Note that embodiments of the present invention apply for arbitrary content bit-depths. Note that while both $Y'_m$ and $Y'_{m+k}$ are constrained to be greater than $d_0$, the same is not true for $Cb_m$, $Cb_{m+k}$, $Cr_m$, and $Cr_{m+k}$. In fact, while $w_Y$ is guaranteed to be non-negative, it is possible to obtain negative values for $w_{Cb}$ and $w_{Cr}$. Based on this, a test may be used to verify if the assumptions so-far are being satisfied. So far, it has been assumed that (a) f=0, (b) the fade takes place in the RGB domain, and that (c) the fade is modeled with Eq. 15.

The following test may then be used to establish whether the aforementioned assumptions are being met:

(a) Given a current frame m and its prediction reference frame m+k, calculate their average luma and chroma component values and denote them as $Y'_m$, $Y'_{m+k}$, $Cb_m$, $Cb_{m+k}$, $Cr_m$, and $Cr_{m+k}$. In an alternative embodiment, instead of DC values, one could use histogram information. The largest and second largest peaks of the histogram or combinations thereof can be used, as they would be less prone to outliers compared to considering only the DC values.

(b) Calculate the gains $w_Y$, $w_{Cb}$, and $w_{Cr}$ with Eq. 21, and compare them. If they are all non-negative and similar enough, then it is determined that the above assumptions are satisfied for the evaluated frame pair of frames m and m+k. Similarity of the gains may be established by checking whether the gains are within 5% to 10% of each other. This may be done by converting the gains to scale between 0 and 1 using a logarithmic function and checking whether the difference of the gains is less than 0.05 or 0.1.

The above test is invoked for each frame in the frame sequence, starting with the first. Alternatively, one may apply it only for frames that have been indicated through some external means, such as a scene classifier or a pre-processor, to have illumination changes. If the above test determines that the assumptions are satisfied, which means that there is (a) a global fading transition with (b) a zero offset that (c) is primarily taking place in the RGB domain, then, optionally, the color parameters can be derived using only global weighted prediction parameters (as described immediately below) and time-costly local weighted prediction can be avoided. If these assumptions are not satisfied, then it can be surmised that the illumination change is either not global or is not taking place in the RGB domain or the offset is not zero. In this case, the illumination change can optionally be addressed on a local basis. The algorithm for determination of local or global illumination changes is depicted in FIG. 1.

A negative result with the above test can also point to the absence of any fading transitions whatsoever. Hence, the above algorithm may also serve as a fade detector or as a component of a fade detection scheme. Furthermore, if there is some external knowledge that the frame contains a fade, then a negative result can help classify it as a local instead of a global fade. Additional embodiments are possible by modifying the algorithm as depicted in FIG. 1 as follows: (a) the determination of the fade type may be done with alternative existing methods, (b) existing methods can be used to derive the weights in step (b) of the above test, (c) and other methods (e.g. DC methods, histogram methods, iterative motion-compensated methods, etc.) could estimate chroma parameters without resorting to a regular WP search for chroma. Note that the chroma estimates could provide the seed for an iterative WP search algorithm that may refine these initial values and thus reduce the number of iterations.

FIG. 1 shows that calculation of local luma WP parameters can be performed prior to calculating and comparing the gains shown above in Eq. 21. However, this is only optional. In an alternative embodiment, the gains shown in Eq. 21 may be computed only from the global luma and chroma DC values. These gains can then be compared to determine if the fade is a local or global fade, e.g., if the gains are nonnegative and similar, the fade is a global fade and the color WP parameters (for luma and chroma) can be estimated without a local search. However, if the gains are negative and/or are not similar, an optionally local search should then be performed for both the chroma and luma WP parameters. Derivation of missing chroma parameters for illumination compensation In this embodiment, algorithms for improved illumination compensation are used when there is a priori knowledge of certain parameters. It is assumed that the following statistics are known in advance: (a) the per-block (e.g., 8×8 pixels) or per-region (e.g., slice) or picture level weighted prediction gains and offsets of the luma component (Y); and, (b) information about the color space conversion. Note that the blocks or region may be overlapping. The goal is to obtain the missing chroma weighted prediction parameters both for global and local (e.g., per-block) illumination compensation. Such a technique reduces computational complexity by searching for the local weighted prediction parameters on a single color space component instead of all three of them. This method, apart from speeding up estimation of missing color parameters, can also serve as a component of a weighted prediction scheme at a decoder: in such an application scenario, the compressed bit stream carries only the aforementioned information (Y parameters and only global DC parameters for the color components) and the decoder infers (similar to implicit weighted prediction in H.264/AVC) the missing color parameters using the proposed method. In another embodiment, decoder information about the luma and chroma relationship may also be transmitted to the decoder.

Situations involving fades will be addressed first. Starting with the case where the luma WP offsets and gains are estimated on a (e.g. 8×8 pixels) block or region basis and the compression system lacks the chroma WP parameters. Compression efficiency will suffer if the chroma WP parameters are not available. A commonly used, but suboptimal solution to this problem is to use some default weighted prediction parameters for the chroma components: a gain of one and an offset of zero for the chroma weighted prediction. Another fairly straightforward solution is to use the luma gains as the chroma gains as well. However, both aforementioned solutions can be inaccurate. In the following paragraphs, an algorithm is presented and described that converts luma WP parameters to chroma WP parameters for efficient fade-in and fade-out weighted prediction.

The algorithm for chroma weighted prediction parameter estimation given the global and local Y luma parameters and information about color space conversion is described below. This algorithm can be triggered if the assumptions are satisfied as described in the section above regarding determination of the nature of the fade. However, this is optional, and it need not be coupled to that method. Assume that for a pixel, block, region or the entire frame m, its luma gains and offsets have been supplied given a reference from frame m+k: $Y'_m = w_Y \times Y'_{m+k} + f_Y$. The goal is to estimate the chroma parameters $w_{Cb}$, $w_{Cr}$, $f_{Cb}$, and $f_{Cr}$ from Eq. 10. There are three major cases:

(a) The gain $w_Y$ is not equal to unity and the offset $f_Y$ is non-zero.

(b) The gain $w_Y$ is not equal to unity and the offset $f_Y$ is zero.

(c) The gain $w_Y$ is equal to unity and the offset $f_Y$ is non-zero.

Figure 2:
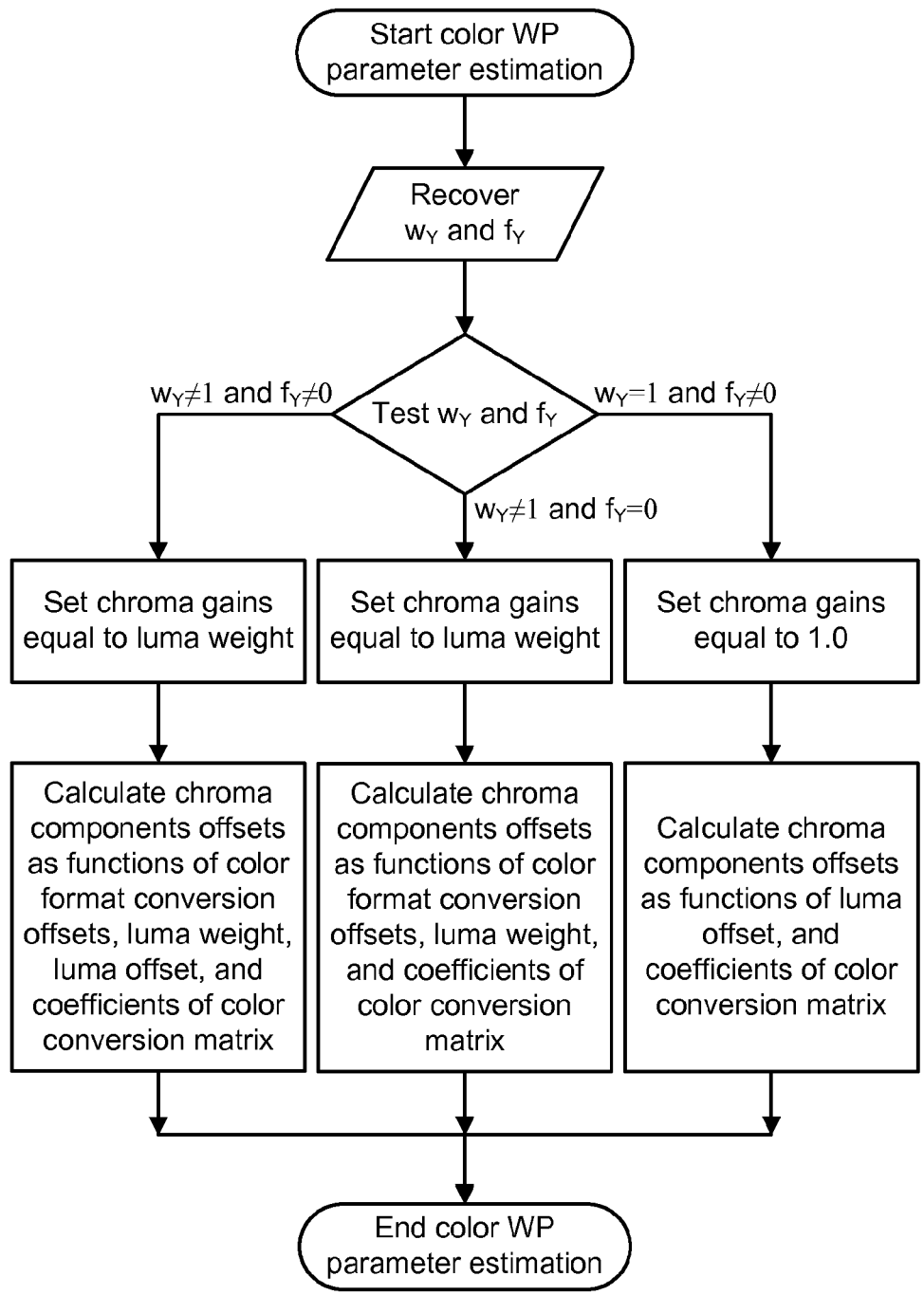
FIG. 2 shows a flowchart of color WP parameter estimation for fades.

FIG. 2 presents a flow chart for WP parameter estimation while addressing the three cases described immediately above. Described below are the details regarding estimation algorithm for each of these three cases.

For the case where the gain $w_Y$ is not equal to unity and the offset $f_Y$ is non-zero (case (a)), employing Eq. 17 provides that the chroma gains are set equal to the luma weight as shown in Eq. 22 below:

$$w_{Cb} = w_Y$$

$$w_{Cr} = w_Y \qquad \text{Eq. 22}$$

Eq. 17 requires that both the RGB-domain gain is equal to the luma gain $w = w_Y$ and that the offset of the Y'CbCr domain is equal to the offset in the RGB domain plus a modifier based on the RGB domain gain and the offset for the luma component $f_Y = f + (1-w)d_0$, which allows the calculation of the RGB domain offset f as: $f = f_Y - (1-w_Y)d_0$. For the offsets of the chroma components using Eq. 16, Eq. 23 below is obtained:

$$f_{Cb} = f \times (c_{10}+c_{11}+c_{12}) + (1-w) \times d_1 = (f_Y - (1-w_Y)d_0) \times (c_{10}+c_{11}+c_{12}) + (1-w_Y) \times d_1$$

$$f_{Cr} = f \times (c_{20}+c_{21}+c_{22}) + (1-w) \times d_2 = (f_Y - (1-w_Y)d_0) \times (c_{20}+c_{21}+c_{22}) + (1-w_Y) \times d_2 \qquad \text{Eq. 23}$$

Note that the offsets of the chroma components are computed as functions of the color format conversion offsets $d_{cmp}$, the Y luma gain $w_Y$, the luma offset $f_Y$, and the coefficients of the RGB-to-Y'CbCr conversion matrix.

Now consider a more practical and complex variation of this case. It can be assumed that the fade transition was effected in the RGB domain by using only gains, which should be a fairly common practice. In this variant, the RGB domain offset f is set to zero and it is further assumed that the color format conversion offset is non-zero: $d_0 \neq 0$. This means that for this algorithm to hold, the following expression is evaluated to determine if it is still valid: $f_Y \approx (1-w_Y)d_0$. If these two quantities are close enough, then this model holds and the chroma offsets may be computed as shown in Eq. 24 below:

$$f_{Cb} = (1-w_Y) \times d_1$$

$$f_{Cr} = (1-w_Y) \times d_2 \qquad \text{Eq. 24}$$

If, on the other hand, the previous expression is not valid $f_Y \neq (1-w_Y)d_0$, then either something is wrong with the assumptions or with the mechanism that supplied $f_Y$ and $w_Y$. In this case, one of the following options can be considered:

(a) Decide in favor of $w_Y$ being the most reliable of the two parameters. Replace $f_Y$ with $f'_Y$ that is computed as: $f'_Y = (1-w_Y)d_0$. Check the new offset in terms of satisfying some reasonable bounds, such as being sufficiently close to the originally supplied $f_Y$, e.g. for 8-bit accuracy within $[f_Y-64, f_Y+64]$. Note though that these bounds could also be content-dependent and can be adaptive. If yes, declare it reliable.

(b) Decide in favor of $f_Y$ being the most reliable of the two parameters. Replace $w_Y$ with $w'_Y$ that is computed as: $w'_Y=(d_0-f_Y)/d_0$. Check the new gain in terms of satisfying some reasonable bounds, such as being between [0.0,1.0]. Note that while it is perfectly valid to use negative gains, for fades it is highly likely the gains can be nonnegative. If yes, declare it reliable.

(c) Decide in favor of $w_Y$ being the most reliable of the two parameters. Set $f_Y$ to zero.

(d) Decide in favor of $f_Y$ being the most reliable of the two parameters. Set $w_Y$ to unity.

For each one of the above four options, the method described above consisting of Eq. 22, Eq. 23, and Eq. 24 is applied to obtain the chroma gains and offsets. Depending on complexity considerations, one of the four options may be tested, that is the one that, e.g., through pre-analysis or other external knowledge, has been deemed to be the most probable, more than one but not all four of them for similar reasons as in the single option case, or all of them either in parallel or serially and select the derived parameters of one of these options by satisfying some criterion. This criterion may comprise minimizing or maximizing some metric (e.g., a distortion metric) or satisfying some sanity checks (e.g., are the derived parameters within reasonable bounds?).

Figure 3:
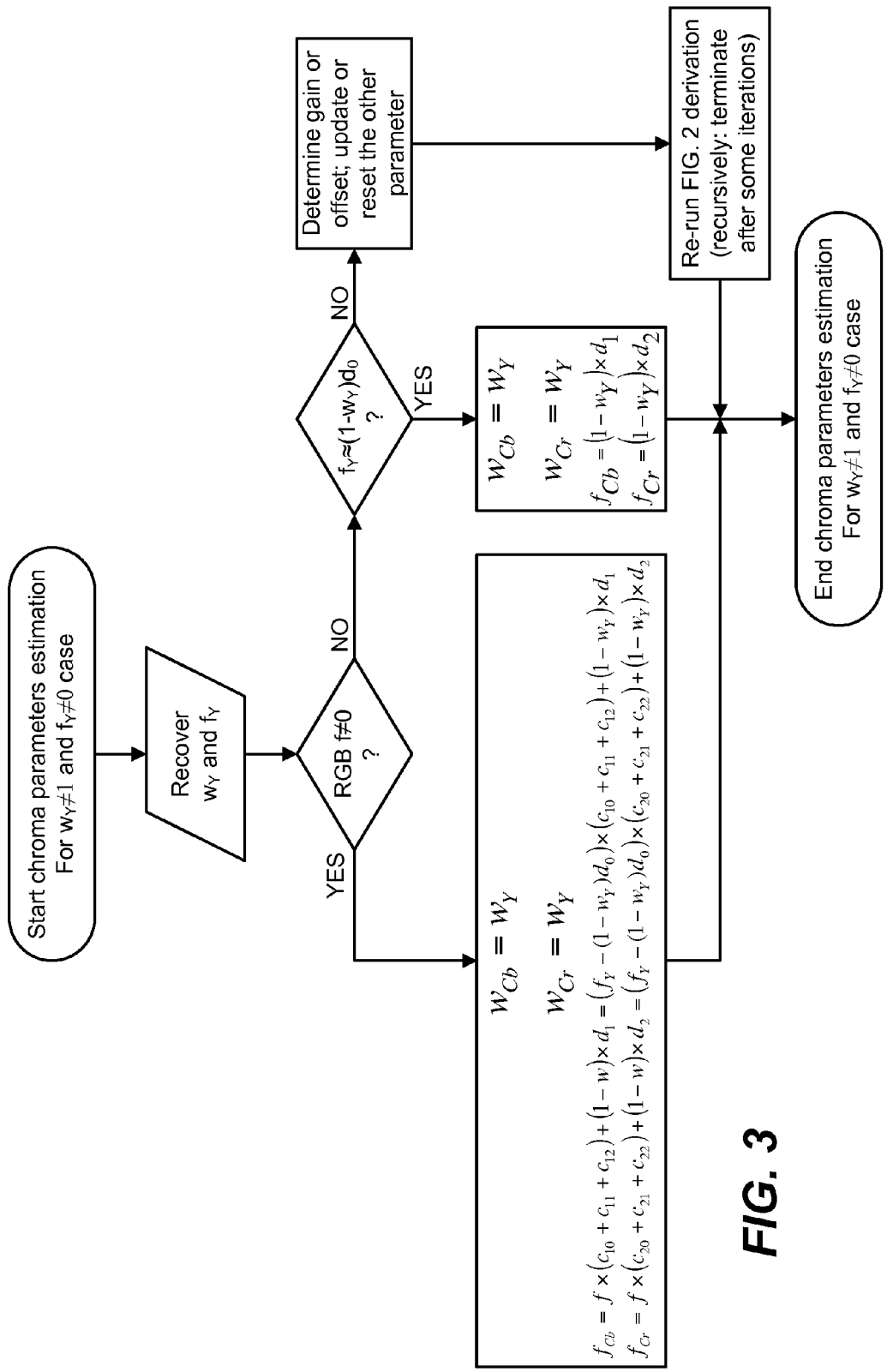
FIG. 3 shows a flowchart of a color parameter derivation algorithm the case where the gain $w_Y$ is not equal to unity and the offset $f_Y$ is non-zero.

The algorithm for color parameter derivation is depicted in FIG. 3 for the case where the gain $w_Y$ is not equal to unity and the offset $f_Y$ is non-zero (case (a)). Note that the algorithms of FIG. 3 can be applied locally (e.g. on a block basis) or globally (for a whole frame). If luma parameter information is available on a local basis then it is preferable to estimate the color component parameters also on a local basis to ensure the best possible performance. Note that not all codecs or pre/post-processing schemes that use motion-compensation, including H.264/AVC, support signaling WP parameters on a local basis. However, in the case of H.264, it is possible to use the local parameters through some features of the codec: e.g., the multiple reference motion-compensated prediction and reference picture list modification features. These features allow one to use up to 16 different sets of WP parameters for each prediction list for motion-compensated prediction of a frame. Thus, in an additional embodiment, the local WP parameters for luma and chroma are processed so that up to 16 more significant sets for each prediction list are selected and transmitted in the bitstream to be used for motion-compensated weighted prediction with the help of reference picture list modification signals. Note that P-coded frames use single-list prediction while B-coded frames support single-list and bi-predictive motion compensation from two lists.

For the case where the gain $w_Y$ is not equal to unity and the offset $f_Y$ is zero (case (b)), the chroma gains are identical to those computed for the case where the gain $w_Y$ is not equal to unity and the offset $f_Y$ is non-zero. The offsets for the chroma Y'CbCr components are given as shown in Eq. 25 below for zero luma offset $f_Y=0$:

$$f_{Cb}=(c_{10}+c_{11}+c_{12})\times(w_Y-1)\times d_0+(1-w_Y)\times d_1$$

$$f_{Cr}=(c_{20}+c_{21}+c_{22})\times(w_Y-1)\times d_0+(1-w_Y)\times d_2 \quad \text{Eq. 25}$$

Again, the offsets of the chroma components are computed as functions of the color format conversion offsets $d_{amp}$, the Y luma weight $w_Y$, and the coefficients of the RGB-to-Y'CbCr conversion matrix.

For the case where the gain $w_Y$ is equal to unity and the offset $f_Y$ is non-zero (case (c)), the chroma gains are all equal to 1.0. The offsets for the chroma Y'CbCr components are given as shown in Eq. 26 below for luma offset $f_Y$:

$$f_{Cb}=f_Y\times(c_{10}+c_{11}+c_{12})$$

$$f_{Cr}\times f_Y\times(c_{20}+c_{21}+c_{22}) \quad \text{Eq. 26}$$

The offsets of the chroma components are computed as functions of the luma offset $f_Y$, and the coefficients of the RGB-to-Y'CbCr conversion matrix.

Note that in most practical RGB to Y'CbCr transformations the sums of the chroma component rows of the transformation matrix are equal to zero as shown in Eq. 27 below:

$$c_{10}+c_{11}+c_{12}=0$$

$$c_{20}+c_{21}+c_{22}=0 \quad \text{Eq. 27}$$

For the case where the gain $w_Y$ is equal to unity and the offset $f_Y$ is non-zero, e.g. case (c), the Eq. 27 means that the offsets will both be zero. Given ITU/SMPTE (Eq. 3) or JFIF (Eq. 7) analog-to-digital conversion, the following simplifications may be derived for the previous three cases:

Case (a): The chroma offsets are written as: $f_{Cb}=f_{Cr}=(1-w_Y)\times128$.

Case (b): The chroma offsets are written as: $f_{Cb}=f_{Cr}=(1-w_Y)\times128$.

Case (c): The chroma offsets are written as: $f_{Cb}=f_{Cr}=0$.

Situations involving cross fades will now be addressed. To model cross-fades, Eq. 14 is used and is further simplified by assuming that the offsets are all zero and by renaming the reference indices as shown in Eq. 28 below:

$$\begin{bmatrix} R_m \\ G_m \\ B_m \end{bmatrix} = w_1 \times \begin{bmatrix} R_1 \\ G_1 \\ B_1 \end{bmatrix} + w_2 \times \begin{bmatrix} R_2 \\ G_2 \\ B_2 \end{bmatrix} \quad \text{Eq. 28}$$

It is again assumed that $w_1+w_2=1$. Combining Eq. 28 with Eq. 9, the expressions shown in Eq. 29 and Eq. 30 below are derived:

$$\begin{bmatrix} Y'_m \\ Cb_m \\ Cr_m \end{bmatrix} = \begin{bmatrix} c_{00} & c_{01} & c_{02} \\ c_{10} & c_{11} & c_{12} \\ c_{20} & c_{21} & c_{22} \end{bmatrix} \left( w_1 \times \begin{bmatrix} R_1 \\ G_1 \\ B_1 \end{bmatrix} + w_2 \times \begin{bmatrix} R_2 \\ G_2 \\ B_2 \end{bmatrix} \right) + \begin{bmatrix} d_0 \\ d_1 \\ d_2 \end{bmatrix} \quad \text{Eq. 29}$$

$$\begin{bmatrix} Y'_m \\ Cb_m \\ Cr_m \end{bmatrix} = w_1 \times \left( \begin{bmatrix} c_{00} & c_{01} & c_{02} \\ c_{10} & c_{11} & c_{12} \\ c_{20} & c_{21} & c_{22} \end{bmatrix} \begin{bmatrix} R_1 \\ G_1 \\ B_1 \end{bmatrix} + \begin{bmatrix} d_0 \\ d_1 \\ d_2 \end{bmatrix} \right) + $$

$$w_2 \times \left( \begin{bmatrix} c_{00} & c_{01} & c_{02} \\ c_{10} & c_{11} & c_{12} \\ c_{20} & c_{21} & c_{22} \end{bmatrix} \begin{bmatrix} R_2 \\ G_2 \\ B_2 \end{bmatrix} + \begin{bmatrix} d_0 \\ d_1 \\ d_2 \end{bmatrix} \right) \quad \text{Eq. 30}$$

to obtain Eq. 31 below:

$$\begin{bmatrix} Y'_m \\ Cb_m \\ Cr_m \end{bmatrix} = w_1 \times \begin{bmatrix} Y'_1 \\ Cb_1 \\ Cr_1 \end{bmatrix} + w_2 \times \begin{bmatrix} Y'_2 \\ Cb_2 \\ Cr_2 \end{bmatrix} \quad \text{Eq. 31}$$

Note that even though the offsets $d_i$ can be non-zero, the $w_1+w_2=1$ condition is enough to ensure that a linear weighted combination in the RGB domain is a linear weighted combination in the Y'CbCr domain as well. Hence in bi-directional prediction for cross-fades, the gains are identical in both color spaces. Hence, if frame m belongs to a cross-fade then the chroma component (Cb and Cr) gains for each reference frame are set equal to the gain of the luma component. The model of Eq. 31 relates to the weighted bi-prediction implementation of the H.264 coding standard, which is now briefly described. Let $p_0$ and $p_1$ denote the samples in each prediction block, and f denote the final predicted value. Let also $w_0$ and $w_1$ denote the gains, $o_0$ and $o_1$ denote the offsets, and log WD denote a term that controls the mathematical precision of the operations. Weighted prediction may then be implemented as shown in Eq. 32 below:

$$f=((p_0 \times w_0 + p_1 \times w_1 + 2^{\log WD}) >> (\log WD+1)) + ((o_0 + o_1 + 1) >> 1) \quad \text{Eq. 32}$$

Flashes and Local Illuminations (Other than Local Fades and Cross-Fades):

Modeling of flashes and local illuminations is inherently more difficult than that of fades and cross-fades. Even though there may be access to the global Y'CbCr component averages, these will not be very useful to deal with local illumination changes. If gains other than unity are available for the luma component, then techniques identical to those discussed for the fades above can be used to determine the gains of the chroma components. If, otherwise, the gains are very close to unity and there are non-zero offsets, a few hypotheses can be made on these offsets in order to derive missing chroma offsets.

The case where the RGB-domain samples are offset is now described. The offsets in the RGB domain are modeled by the expression shown in Eq. 33 below:

$$\begin{bmatrix} R_m \\ G_m \\ B_m \end{bmatrix} = \begin{bmatrix} R_{m+k} \\ G_{m+k} \\ B_{m+k} \end{bmatrix} + \begin{bmatrix} f_R \\ f_G \\ f_B \end{bmatrix} \quad \text{Eq. 33}$$

By combining Eq. 33 with Eq. 9, the expression shown in Eq. 34 is obtained:

$$\begin{bmatrix} Y'_m \\ Cb_m \\ Cr_m \end{bmatrix} = \begin{bmatrix} Y'_{m+k} \\ Cb_{m+k} \\ Cr_{m+k} \end{bmatrix} + \begin{bmatrix} c_{00} f_R + c_{01} f_G + c_{02} f_B \\ c_{10} f_R + c_{11} f_G + c_{12} f_B \\ c_{20} f_R + c_{21} f_G + c_{22} f_B \end{bmatrix} \quad \text{Eq. 34}$$

Since $f_Y$ is known, then $c_{00} f_R + c_{01} f_G + c_{02} f_B = f_Y$, which is an equation with three unknowns: ($f_R$, $f_G$, $f_B$). The per-block $f_Y$ is translated to the missing per-block $f_{Cb}$ and $f_{Cr}$ offsets. Solutions for this problem are available if some simplifying assumptions are made. Four possible solutions are presented below:

(a) Assume that $f_R = f_G = f_B$. Since $c_{00} + c_{01} + c_{02} = 1$, then $f_Y = f_R = f_G = f_B$. Due to $c_{10} + c_{11} + c_{12} = 0$ and $c_{20} + c_{21} + c_{22} = 0$ for the BT.601 conversion of Eq. 2, then: $f_{Cb} = 0$ and $f_{Cr} = 0$.

(b) Assume that $f_R = f_G = 0$. This provides that $f_Y = c_{02} f_B$ ⇔ $f_B = f_Y / c_{02}$. The chroma offsets are then computed as: $f_{Cb} = (c_{12} \times f_Y) / c_{02}$ and $f_{Cb} = (c_{22} \times f_Y) / c_{02}$.

(c) Assume that $f_R = f_B = 0$. This provides that $f_Y = c_{01} f_G$ ⇔ $f_G = f_Y / c_{01}$. The chroma offsets are then computed as: $f_{Cb} = (c_{11} \times f_Y) / c_{01}$ and $f_{Cb} = (c_{21} \times f_Y) / c_{01}$.

(d) Assume that $f_G = f_B = 0$. This provides that $f_Y = c_{00} f_R$ ⇔ $f_R = f_Y / c_{00}$. The chroma offsets are then computed as: $f_{Cb} = (c_{10} \times f_Y) / c_{00}$ and $f_{Cb} = (c_{20} \times f_Y) / c_{00}$.

Figure 4:
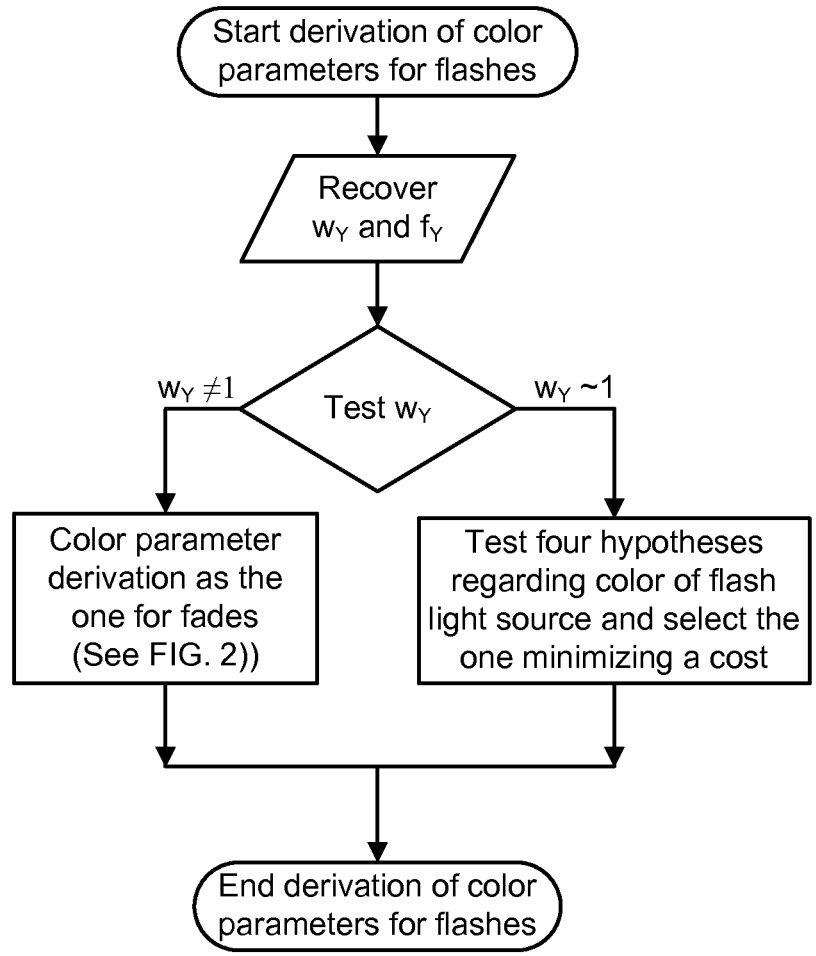
FIG. 4 shows a flowchart of an algorithm for derivation of color WP parameters for flashes.

The above four solutions represent the assumptions that (a) the light source was white, (b) the light source was primarily blue, (c) the light source was primarily green, and (d) the light source was primarily red, respectively. During coding, any of these solutions can be used when coding a flash scene, or all of those can be enabled and the best solution can be selected by minimizing some cost, e.g. a Lagrangian cost. This method is illustrated in FIG. 4. In an additional embodiment, the equation with the three unknowns can be used to speed up the search. A search is conducted for two of the unknowns and the third one is derived using that equation. This is possible for any pairwise combination of the three unknowns. Another variant is also described: the parameters for the first component are derived by doing a search and the second is derived both with a search and also by testing one of the above four solutions. If the value for the second component is close to the one of the above solutions then the third component is estimated with the method discussed above. Otherwise, a search is conducted for the third component. Additional speedup is possible by considering previous decisions, e.g. for the past frame. If the frames share similar characteristics, such as variance, luminance, chrominance, and/or texture information, among others, one may use this information to speed up the process.

Decoder Embodiments

Figure 16:
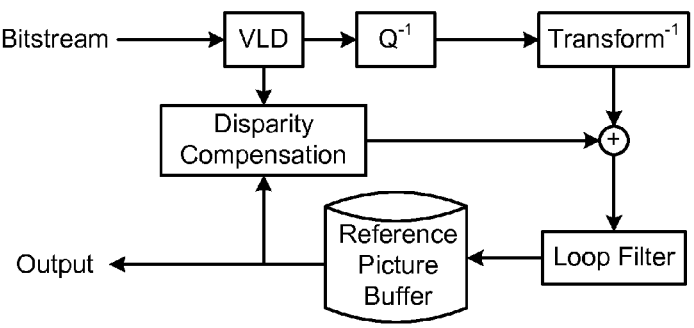
FIG. 16 shows a block diagram of a hybrid video decoder.

The above methods for estimation of missing chroma parameters from known local or global luma parameters and knowledge about the color space conversion scheme can be used as part of a video decoder as illustrated in FIG. 16. In such an embodiment, the compressed bit stream carries the readily available information and the decoder applies the methods to derive the local or global chroma parameters prior to performing weighted prediction as part of the disparity compensation module. In an additional embodiment, instead of fully deriving the missing chroma parameters, one can use them as predictors to transmit the WP parameters' prediction residual in the coded bit stream. The decoder receives the transmitted residual and adds to it the prediction that is obtained using the methods to yield the missing chroma parameters and form the weighted prediction samples. A different embodiment transmits in the bit stream information/parameters about the relationship between the luma and chroma parameters, or the color space components in general. This information may consist of a matrix, such as the conversion matrices used to obtain the color space components, a transition equation or matrix for gains and offsets of different components (e.g. from luma to chroma, from U to V, etc.), or of some equation parameters. It may also include characterization information such as whether the current frame is a fade or a cross-fade, or whether some of the assumptions that drive the method described above are satisfied or not. This information can be used at the decoder together with our method and other bitstream information to derive the missing color space component parameters.

An additional embodiment similar to the one described above is defined in cases where the compressed bitstream does not convey the WP parameters and they are derived at the decoder side using available causal information. See, for example, P. Yin, A. M. Tourapis, and J. M. Boyce, "Localized weighted prediction for video coding," Proc. IEEE International Symposium on Circuits and Systems, May 2005, vol. 5, pp. 4365-4368. Instead of searching at the decoder for the parameters for all color components, a method according to an embodiment of the present invention can be used to constrain the search in, e.g., only the luma component, and then help derive the missing, e.g., color component parameters. This embodiment is valid both for local and global weighted prediction.

Additional Embodiments

The above methods can be applied on a local basis to derive local chroma parameters. This is possible even in codecs, such as H.264/AVC as described earlier through the use of reference picture list modification and multiple references for motion-compensated prediction. Improved performance is possible by applying different methods for each image region and type of illumination change. For example, one region may be classified as a fade-in and the other as a flash. The regions may be overlapping. Each region will be handled by the appropriate algorithm (fade method for the former and local illumination/flash method for the latter). The segmentation of the image into regions can be facilitated using some existing algorithm or using chroma or luma information extracted by these methods. For example, the DC values or histogram information could thus be computed on a region/local basis. Segmentation may benefit from motion compensation and is useful in tracking objects in the scene that share similar chroma information. Chroma parameters can thus benefit from some initialization values that improve the chances of deriving the correct missing chroma parameters and speed up the derivation.

Another embodiment that is derived by simply inverting the use of certain terms makes possible the derivation of missing luma parameters from known chroma parameters. Since the conversion matrices used are fairly generic, it is not cumbersome to modify the equations so that the problem is reformulated into finding missing parameters of any component given parameters from the other components and knowledge about the color space conversion matrices/equations. This embodiment can also be combined with the above decoder embodiments.

Methods according to embodiments of the present invention may also be combined with iterative WP parameter estimation that is augmented with motion estimation and compensation. As described in J. M. Boyce, "Weighted prediction in the H.264/MPEG-4 AVC video coding standard," one may first estimate initial WP parameters, then perform motion estimation, and then re-estimate the WP parameters using the motion information obtained in the previous step, followed by another round of motion estimation, and iterating further until some criterion has been satisfied (e.g. max number of iterations, among others). In an additional embodiment, a method according to an embodiment of the present invention may be used to seed/initialize the first iteration of such an iterative method. To further speedup calculations it may optionally be used with intermediate iterations. Last, information from previous iterations may be used to decide in advance which of the available modes, e.g. case (a) or (b), is the correct one for the given content, leading to additional speedup.

In one embodiment, weighted prediction on a local basis with the above method is possible if the codec supports signaling WP gains and factors on a region, macroblock, or block level. Regions or blocks may be overlapping. For embodiments that employ codecs such as H.264 that only support signaling WP parameters on a slice level, use of different WP parameters on a local level is possible through the joint use of multiple reference motion-compensated prediction and reference reordering/modification. In different embodiments, the above methods may be incorporated into a pre or post-processing module that may also involve motion estimation and compensation (a motion-compensated temporal pre or post-filter) in combination with weighted prediction.

Illumination compensation parameter derivation for cases where illumination changes took place in a color space domain other than the domain used during compression and the conversion matrix/equations are not linear.

The descriptions above made the assumption that the conversion from the starting color space to the end color space was linear. However, there are examples where this assumption does not hold. Consider, for example, the case where fades and cross-fades were artificially generated by processing samples directly in the linear-domain RGB color space, prior to applying gamma correction. The same is also true when the linear-space RGB (or even gamma-space RGB) is converted to a log-space RGB or YCbCr color space. This, for example, happens when considering coding of high dynamic range, described in log-space RGB or YCbCr, image and video content. The change in WP parameters from the starting color space to the end color space is modeled as described below. Two embodiments are described, one for gamma-corrected RGB (R'G'B') and another for log-space RGB (R"G"B").

The generic gamma correction equation of Eq. 1 may be simplified to Eq. 35 as shown below:

$$R' = R^\gamma$$

$$G' = G^\gamma$$

$$B' = B^\gamma \qquad \text{Eq. 35}$$

For log-space RGB, Eq. 36 as shown below is derived:

$$R'' = \log R$$

$$G'' = \log G$$

$$B'' = \log B \qquad \text{Eq. 36}$$

The effect of the conversions on the prediction of fades and cross-fades is described below.

Fades.

For gamma-corrected RGB, the simplest case is where the fade is modeled with a single gain as shown in Eq. 37 below:

$$\begin{bmatrix} R_m \\ G_m \\ B_m \end{bmatrix} = w \times \begin{bmatrix} R_{m+k} \\ G_{m+k} \\ B_{m+k} \end{bmatrix} \qquad \text{Eq. 37}$$

To calculate w' and f', for their gamma-corrected counterparts, Eq. 38 as shown below may be used:

$$\begin{bmatrix} R'_m \\ G'_m \\ B'_m \end{bmatrix} = w' \times \begin{bmatrix} R'_{m+k} \\ G'_{m+k} \\ B'_{m+k} \end{bmatrix} + f' \times \begin{bmatrix} 1 \\ 1 \\ 1 \end{bmatrix} \qquad \text{Eq. 38}$$

Combining Eq. 35 and Eq. 38, the expression shown in Eq. 39 is obtained:

$$\begin{bmatrix} R'_m \\ G'_m \\ B'_m \end{bmatrix} = \begin{bmatrix} (w \times R_{m+k})^\gamma \\ (w \times G_{m+k})^\gamma \\ (w \times B_{m+k})^\gamma \end{bmatrix} = \begin{bmatrix} w^\gamma \times R^\gamma_{m+k} \\ w^\gamma \times G^\gamma_{m+k} \\ w^\gamma \times B^\gamma_{m+k} \end{bmatrix} = w^\gamma \times \begin{bmatrix} R'_{m+k} \\ G'_{m+k} \\ B'_{m+k} \end{bmatrix} \qquad \text{Eq. 39}$$

The above equation shows that a fade in the linear RGB domain that is modeled with a gain factor w can be modeled in the gamma-corrected R'G'B' domain again by using a gain factor $w^\gamma$. It can be concluded that fade transitions modeled by gain factors in the linear RGB domain can be compensated in the gamma-corrected R'G'B' domain. Note that even though the term $\gamma$ is used, this does not imply an assumption that $\gamma$ is identical for each component. Since the above operations may be applied on a component basis, the described method is applicable for cases where the exponent differs per component. For example, for component R one derives factor $w^{\gamma_R}$.

For log-space RGB, similarly to above, w" and f" are computed for their log-space counterparts as shown in Eq. 40 below:

$$\begin{bmatrix} R''_m \\ G''_m \\ B''_m \end{bmatrix} = w'' \times \begin{bmatrix} R''_{m+k} \\ G''_{m+k} \\ B''_{m+k} \end{bmatrix} + f'' \times \begin{bmatrix} 1 \\ 1 \\ 1 \end{bmatrix} \qquad \text{Eq. 40}$$

Combining Eq. 36 and Eq. 40, the expression shown in Eq. 40 is obtained:

$$\begin{bmatrix} R''_m \\ G''_m \\ B''_m \end{bmatrix} = \begin{bmatrix} \log(w \times R_{m+k}) \\ \log(w \times G_{m+k}) \\ \log(w \times B_{m+k}) \end{bmatrix} = \qquad \text{Eq. 41}$$

$$\begin{bmatrix} \log w + R''_{m+k} \\ \log w + G''_{m+k} \\ \log w + B''_{m+k} \end{bmatrix} = \begin{bmatrix} R''_{m+k} \\ G''_{m+k} \\ B''_{m+k} \end{bmatrix} + \log w \times \begin{bmatrix} 1 \\ 1 \\ 1 \end{bmatrix}$$

Eq. 41 above shows that a fade in the linear RGB domain that is modeled with a gain factor w can be modeled in the log space R"G"B" domain with an offset set to log w.

Cross-Fades.

Now consider an embodiment for gamma-corrected RGB using the simple but practical model of Eq. 28. Using Eq. 37 with this model, the expression shown in Eq. 42 is obtained:

$$\begin{bmatrix} R'_m \\ G'_m \\ B'_m \end{bmatrix} = \begin{bmatrix} (w_1 \times R_1 + w_2 \times R_2)^\gamma \\ (w_1 \times G_1 + w_2 \times G_2)^\gamma \\ (w_1 \times B_1 + w_2 \times B_2)^\gamma \end{bmatrix} \qquad \text{Eq. 42}$$

Looking at Eq. 42 above, it becomes obvious that it is challenging to derive a linear relationship between the gamma-corrected components of the two reference frames and that of the current frame m. Some insight can be gained by attempting to analyze one of the sums that are set to the power of $\gamma$, e.g., $(w_1 \times R_1 + w_2 \times R_2)^\gamma$. This may be first simplified as shown in Eq. 43 below:

$$(w_1 \times R_1 + w_2 \times R_2)^\gamma = (w_1 \times R_1)^\gamma \left(1 + \frac{w_2 \times R_2}{w_1 \times R_1}\right)^\gamma \qquad \text{Eq. 43}$$

The right-most term may be expanded employing a binomial series, which is defined as shown in Eq. 44:

$$(1+x)^\alpha = \sum_{k=0}^{\infty} \binom{\alpha}{k} x^k \qquad \text{Eq. 44}$$

Since $\alpha$ is a real and not an integer number, the binomial coefficient may be computed as shown in Eq. 45:

$$\binom{z}{k} = \prod_{n=1}^{k} \frac{z-k+n}{n} \qquad \text{Eq. 45}$$

Thus, the equation shown in Eq. 46 is obtained:

$$(w_1 \times R_1 + w_2 \times R_2)^\gamma = (w_1 \times R_1)^\gamma + \gamma \times (w_1 \times R_1)^{\gamma-1} \times (w_2 \times R_2) + \qquad \text{Eq. 46}$$

$$\frac{\gamma \times (\gamma - 1)}{2} \times (w_1 \times R_1)^{\gamma-2} \times$$

$$(w_2 \times R_2)^2 + \ldots$$

$$= (w_1 \times R_1)^\gamma + \gamma \times \left(\frac{w_1 \times R_1}{w_2 \times R_2}\right)^{\gamma-1} \times$$

$$(w_2 \times R_2)^\gamma + \frac{\gamma \times (\gamma-1)}{2} \times \left(\frac{w_1 \times R_1}{w_2 \times R_2}\right)^{\gamma-2} \times$$

$$(w_2 \times R_2)^\gamma + \ldots$$

$$= (w_1 \times R_1)^\gamma + (w_2 \times R_2)^\gamma \times$$

$$\left( \gamma \times \left(\frac{w_1 \times R_1}{w_2 \times R_2}\right)^{\gamma-1} + \frac{\gamma \times (\gamma-1)}{2} \times \right.$$

$$\left. \left(\frac{w_1 \times R_1}{w_2 \times R_2}\right)^{\gamma-2} + \ldots \right)$$

However, the expansion shown in Eq. 45 may not be particularly helpful. One conclusion is that a cross-fade, which is generated by processing in the linear RGB domain that involves a weighted average of two references, can be compensated in the gamma-corrected R'G'B' domain using a weighted average of two (gamma-corrected) references, plus a non-zero offset. Alternatively, it is possible to model the cross-fade using only gains, but in that case they will most often be unequal and will not sum to one. If there is access to the original gains and the $R_1$ and $R_2$ values, the resulting offset can be computed up to a certain precision. For well-behaved content and for reference frames that are equidistant from frame m, it can be assumed that $w_1 = w_2 = \frac{1}{2}$. Such an assumption can simplify the above calculations for the gains and offset in the RGB domain.

Figure 5:
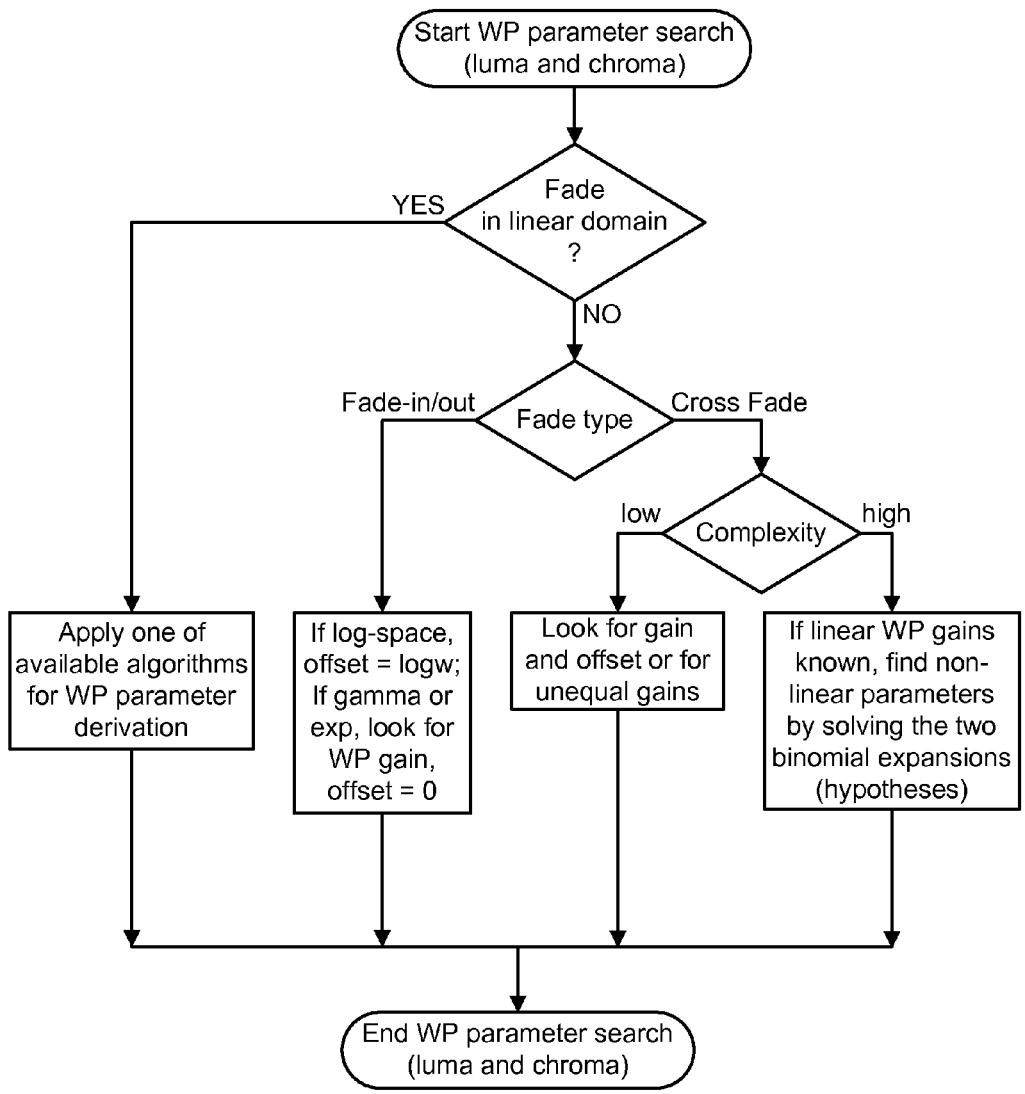
FIG. 5 shows a flowchart for an algorithm for WP Parameter derivation for fades in the linear domain.

Furthermore, note that the above solution is based on expanding the sum by keeping multiplier $(w_2 \times R_2)^\gamma$ outside of the infinitesimal summation within the parenthesis. It is quite possible to obtain an alternative expansion where this time term $(w_1 \times R_1)^\gamma$ will be the multiplier of an alternative infinitesimal summation. Hence, two distinct and equally correct solutions (hypotheses) for the problem of determining the gains and offset in the gamma-corrected domain for linear domain-generated cross-fades can be obtained. Averaging the gains and offsets of the two solutions can improve illumination compensation. This method is illustrated in FIG. 5. Note that even though the term $\gamma$ is used, this does not imply an assumption that $\gamma$ is identical for each component. Since the above operations may be applied on a component basis, the described method is also applicable for cases where the exponent differs per component.

Similar solutions as the above one can be applied for cross-fades in the log-space domain. In this embodiment, the main difference is that instead of modeling the cross-fade mainly with the help of gain factors, in this case, the cross fade will be modeled primarily with the help of offsets, as was found to be true for the case of fades. A straightforward solution is to set the offsets for weighted bi-prediction equal to the logarithms of the gain factors in the starting domain (e.g. linear RGB domain).

Additional Embodiments

Note that similar embodiments are also possible for conversion from and to other color spaces, e.g., gamma-corrected RGB to log-space RGB, or some other second color space that is obtained from the first color space through a non-linear transformation.

In one embodiment, weighted prediction on a local basis with the above method is possible if the codec supports signaling WP gains and factors on a macroblock, block, or region level. Regions or blocks may be overlapping. For embodiments that employ codecs such as H.264 that only support signaling WP parameters on a slice level, use of different WP parameters on a local level is possible through the joint use of multiple reference motion-compensated prediction and reference reordering/modification. In a different embodiment, the above methods may be incorporated into a pre or post-processing module that may also involve motion estimation and compensation (a motion-compensated temporal pre or post-filter) in combination with weighted prediction.

Another embodiment finds application in scalable video coding, where the content is compressed into two layers, a base layer (BL) and an enhancement layer (EL), where the EL is often predicted from the BL. There may be cases where the BL is compressed using a first color representation, while the EL is compressed using a second color representation, which, e.g., may be non-linear (log-space), in contrast to the first, which may be linear or gamma corrected. The methods described herein can be used to convert WP parameters derived for one layer to the other layer. This can be implemented both on the decoder as well as on an encoder, removing thus the need to transmit parameters for two different color representations. Optionally, the illumination and motion compensated residual, computed by subtracting the predicted (e.g., EL) WP parameters given one layer (e.g., BL) from the actual EL parameters, may be transmitted to the decoder in the EL to help reconstruct and use the actual parameters by adding the prediction from the BL.

Fade and Cross-Fade Detection Using Illumination Change Relationships.

In this section, an algorithm is described that is useful both for fade and cross-fade detection. It does so by detecting the start and end frames of fades and cross-fades. The algorithm is based on the assumption that the fade or cross-fade is largely linear and is thus modeled by equations such as those of Eq. 31 and Eq. 37. This assumption translates to gain factors $w_i$ that are proportional to the distance between the current frame and the reference frame(s). One possible embodiment of the algorithm for the Y' component is presented, but note that any other component of the RGB domain can be considered, or some other linear color space domain, and still demarcate fades and cross-fades. Under some conditions, this algorithm could be extended to the Cb and Cr components, however, their DCs may be unreliable for the purpose of fade and cross-fade detection. In a different embodiment, the joint use of one or more color space components can increase the reliability of this fade detection method. For purposes of this description, let denote the DC average value of the Y' component of frame m.

First, some properties that stem from the assumption that the fade transitions are linear are presented below.

A. The value of the DC of frame m is approximately equal to the average of the value of the DCs of its previous and subsequent frames:

$$Y'_{m,dc} \cong \frac{Y'_{m-1,dc} + Y'_{m+1,dc}}{2} = Y'_{m,dc}(A).$$

This property holds as a consequence of Eq. 31 and Eq. 37.

B. The value of the DC of frame m is approximately equal to two times the DC value of its next frame minus the DC value of the frame succeeding its next frame: $Y'_{m,dc} \approx 2 \times Y'_{m+1,dc} - Y'_{m+2,dc} = Y'_{m,dc}(B)$. This holds as a result of Property A above.

C. The value of the DC of frame m is approximately equal to the sum of twice the DC value of its previous frame plus the DC value of the frame succeeding its next frame over three:

$$Y'_{m,dc} \cong \frac{2 \times Y'_{m-1,dc} + Y'_{m+2,dc}}{3} = Y'_{m,dc}(C).$$

This holds as a result of Properties A and B. Cases (c) and (d) may also be defined in a reversed order. These definitions follow.

D. The value of the DC of frame m is approximately equal to two times the DC value of its previous frame minus the DC value of the frame preceding its previous frame: $Y'_{m,dc} \approx 2 \times Y'_{m-1,dc} - Y'_{m-2,dc} = Y'_{m,dc}$ (D). This holds as a result of Property A.

E. The value of the DC of frame m is approximately equal to the sum of twice the DC value of its next frame plus the DC value of the frame preceding its previous frame over three:

$$Y'_{m,dc} \cong \frac{2 \times Y'_{m+1,dc} + Y'_{m-2,dc}}{3} = Y'_{m,dc}(E).$$

This holds as a result of Properties A and D.

The application of the above cases to the situations that are depicted in FIG. 6, FIG. 7, FIG. 8, and FIG. 9 is described below along with derivations of some conditions tied to each of the situations.

Condition 1: For the case of an end of a fade with a decreasing DC value (see FIG. 6), the following inequalities will be true: the DC value of frame m+2 of property C will be larger than that of property A, which will be larger than that of property B $Y'_{m+2,dc}$ (C)>$Y'_{m+2,dc}$ (A)>$Y'_{m+2,dc}$ (B) and the same will be true for the DC values of frame m+1 $Y'_{m+1,dc}$ (C)>$Y'_{m+1,dc}$ (A)>$Y'_{m+1,dc}$ (B).

Condition 2: For the case of an end of a fade with an increasing DC value (see FIG. 7), the following inequalities will be true: the DC value of frame m+2 of property C will be lower than that of property A, which will be lower than that of property B $Y'_{m+2,dc}$ (C)<$Y'_{m+2,dc}$ (A)<$Y'_{m+2,dc}$ (B) and the same will be true for the DC values of frame m+1 $Y'_{m+1,dc}$ (C)<$Y'_{m+1,dc}$ (B).

Condition 3: For the case of a start of a fade with an increasing DC value (see FIG. 8), the following inequality will be true: the DC value of frame m+2 of property E will be larger than that of property A, which will be larger than that of property D $Y'_{m+2,dc}$ (E)>$Y'_{m+2,dc}$ (A)>$Y'_{m+2,dc}$ (D) and the same will be true for the DC values of frame m+3 $Y'_{m+3,dc}$ (E)>$Y'_{m+3,dc}$ (A)>$Y'_{m+3,dc}$ (D).

Condition 4: For the case of a start of a fade with a decreasing DC value (see FIG. 9), the following inequality will be true: the DC value of frame m+2 of property E will be lower than that of property A, which will be lower than that of property D $Y'_{m+2,dc}$ (E)<$Y'_{m+2,dc}$ (A)<$Y'_{m+2,dc}$ (D) and the same will be true for the DC values of frame m+3 $Y'_{m+3,dc}$ (E)<$Y'_{m+3,dc}$ (A)<$Y'_{m+3,dc}$ (D).

In an alternative embodiment, the above conditions may be tested by sub-sampling the input sequence temporally and spatially. This could be beneficial for faster computation in the case of, e.g., longer fading transitions. It could also help with eliminating outliers and thus increase the efficiency of the detector. Sub-sampling in the temporal axis may also benefit from temporal filtering of the statistics used for the detection algorithm.

Figure 10:
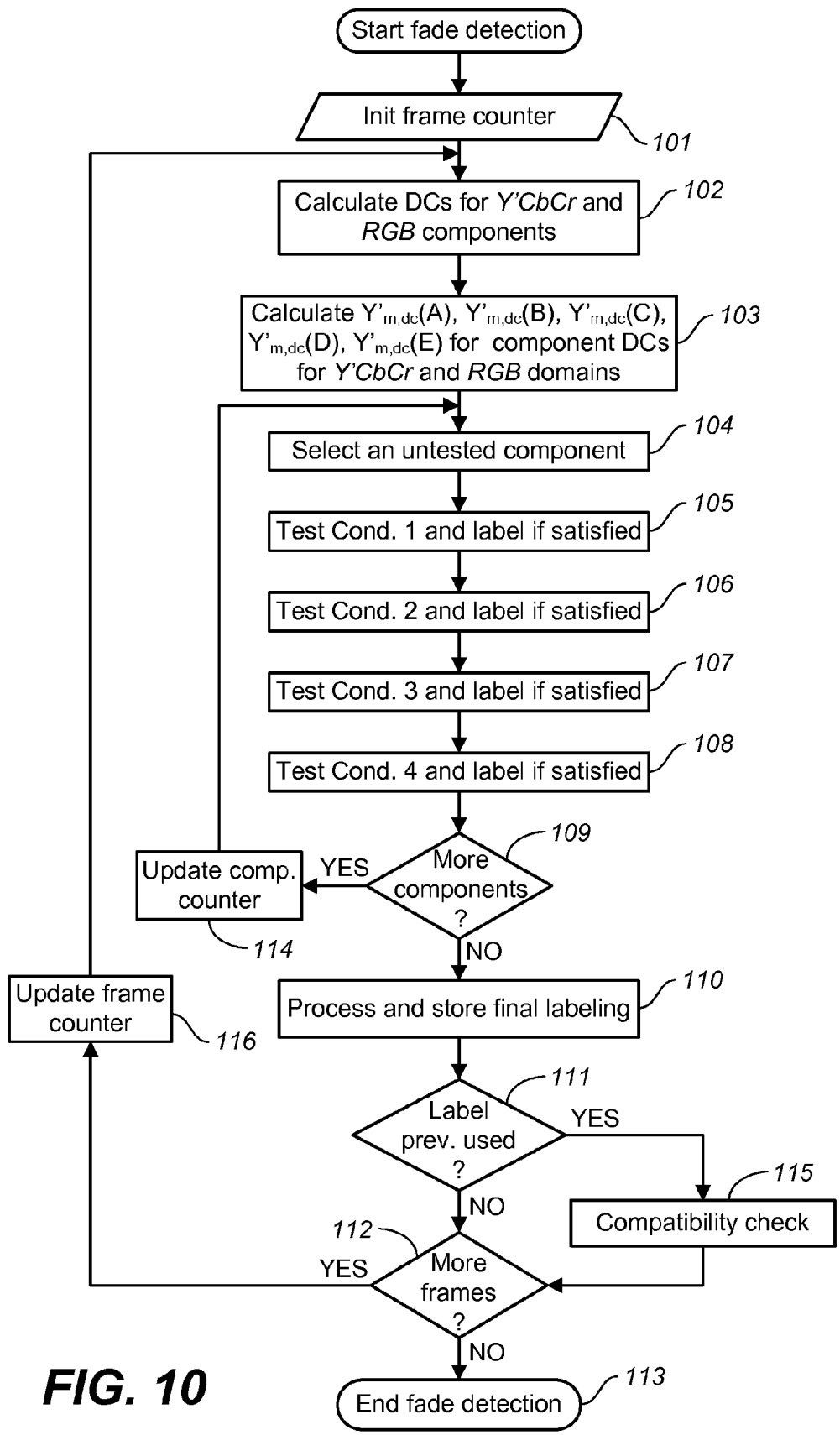
FIG. 10 shows a flowchart of an algorithm for fade detection using illumination relationships.

The fade and cross-fade detection algorithm resulting from the analysis of the above cases and conditions is described below. A flowchart of this algorithm is illustrated in FIG. 10 (step numbers refer to label numbers used in FIG. 10).

(a) Step 101: Initialize frame counter and start parsing frames. Go to Step 102.
(b) Step 102: For current frame m, calculate DC values of Y'CbCr and RGB domain components. Go to Step 3.
(c) Step 103: For current frame m, calculate terms $Y'_{m,dc}$ (A), $Y'_{m,dc}$ (B) $Y'_{m,dc}$ (C), $Y'_{m,dc}$(D), and $Y'_{m,dc}$ (E) for all component DCs of the RGB domain and the Y' component of the Y'CbCr domain. Go to Step 4.
(d) Step 104: Select a component of a domain that has not been tested yet.
(e) Step 105: Test Condition 1, with respect to frames m−1 and m. If satisfied, then label frame in an end frame of a fade with decreasing DC value.
(f) Step 106: Test Condition 2, with respect to frames m−1 and m. If satisfied, then label frame in an end frame of a fade with increasing DC value.
(g) Step 107: Test Condition 3, with respect to frames m−1 and m. If satisfied, then label frame m−1 a start frame of a fade with increasing DC value.
(h) Step 108: Test Condition 4, with respect to frames m−1 and m. If satisfied, then label frame m−1 a start frame of a fade with decreasing DC value.
(i) Step 109: If there are more unselected color space domain components, update the component counter 114 and go to step 104; otherwise go to Step 110.
(j) Step 110: Process labeling: If there are conflicting labels, select the one that has the most occurrences. It is also possible here to weight certain component labels as more important than others (e.g., Y more important than Cb or Cr). The decision metric could hence be weighted. Store the final labeling. Go to Step 111.
(k) Step 111: Check if any previous final labeling has been stored before after processing frames prior to the current frame m. If no, go to Step 112. Otherwise, check whether the current and previously stored labeling are "compatible" (step 115): e.g., if the previous label was "start frame of fade with increasing DC" and the current label is "end frame of fade with increasing DC", then it can be declared that the sequence of those frames comprise a fade-in. If, however, the current label is "start frame of fade with decreasing DC" then there is a false alarm. Alternatively, if the current label is "end frame of fade with decreasing DC" it can be surmised that the sequence of frames is a cross-fade. Go to Step 112.
(l) Step 112: Determine whether there are more frames to parse. If yes, update the frame counter (step 115) and go to Step 102. Otherwise, go to Step 113.
(m) Step 113: Terminate parsing of frames.

Note that in an additional embodiment, instead of considering the DCs of frames, one may consider the mode of a histogram of the frame or a combination of the highest values of the histogram. Temporal and/or spatial sub-sampling may also be used to constrain computational complexity. Sub-sampling may differ on a color component basis: color space components that are known to be more affected by fades could benefit from a lower sub-sampling factor. When more than one component is used for joint detection, additional speedup is possible by adopting a decision hierarchy: the components can be ordered according to how well they facilitate detection of fades. If the first component is processed with this detection method and the result is negative then there is no need to check the remaining components. In a different embodiment, this method may also be applied on a region-basis, optionally enhanced through segmentation, in order to detect local fades or cross-fades. In such a case, statistics such as DCs, or even histograms, should be computed for the given region. In a different embodiment, the above methods may be incorporated into a pre or post-processing module that may also involve motion estimation and compensation (a motion-compensated temporal pre or post-filter) in combination with weighted prediction.

Low-Complexity Cross-Fade Detection.

Figure 11:
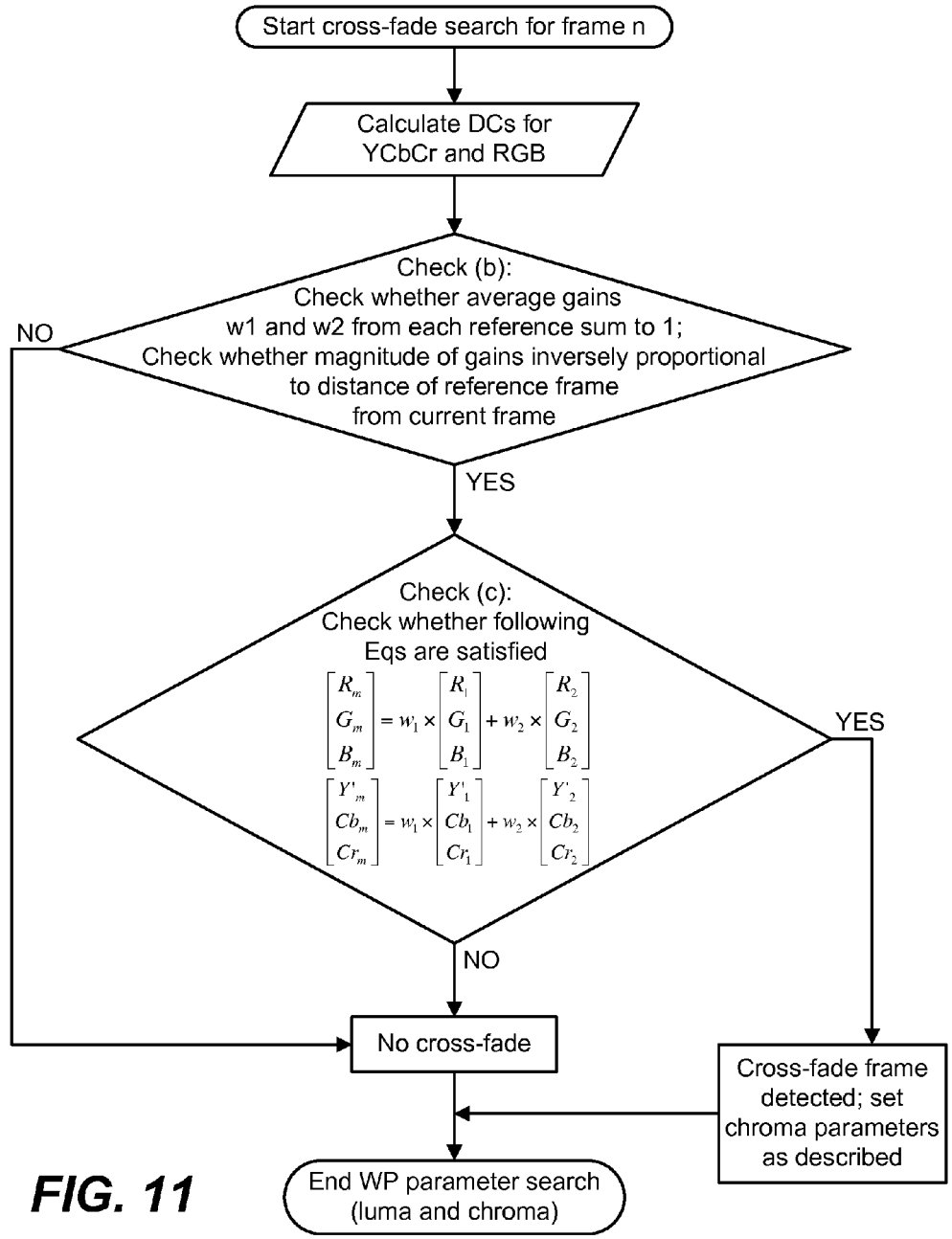
FIG. 11 shows a flowchart of an algorithm for a low-complexity cross-fade detector.

The classification of the frame as a fade can be done through a third party algorithm or through an algorithm such as the algorithm illustrated in FIG. 11 and described below:

(a) For the current frame m, calculate its average values of the RGB and Y'CbCr color spaces components: ($R_m,G_m,B_m$) and ($Y'_m,Cb_m,Cr_m$). Also calculate the average values of the RGB and Y'CbCr color spaces components for its bi-directional prediction reference frames: ($R_1,G_1,B_1$), ($Y'_1,Cb_1,Cr_1$), ($R_2,G_2,B_2$), and ($Y'_2,Cb_2,Cr_2$). These average values may be computed as the DC values on a whole frame or some region, or as the histogram modes or combination of the highest peaks of the histogram or histograms (assuming that multiple histograms are computed per frame).
(b) Verify whether the average gains $w_1$ and $w_2$ from each reference sum up to 1. Verify also whether the magnitude of the gains is inversely proportional to the distance of the reference frame from the current frame, e.g., for equidistant frames, the expectation is that gains of approximately one-half would be observed.
(c) Finally, test whether Eq. 28 and Eq. 31 are satisfied when plugging in the values from the previous two steps. If the chroma component gains are unknown (as in this case), set them to the values of the luma component gains for both color spaces.

If the above tests are satisfied, the frame is declared a cross-fade frame and the chroma component weights for the Y'CbCr domain are set as described above.

Illumination Compensation Parameter Derivation with Clipping and Saturation

The previous derivation of the quantized digital versions of the Y'CbCr domain shows that it is possible that the Y'CbCr components may not use the full range of [0,255] for 8-bit unsigned integers. In fact, for the BT.601 conversion (Eq. 6) and recommended analog-to-digital conversion method (Eq. 3), the resulting ranges are Y'∈[16,235], Cb ∈[16,240], and Cr∈[16,240]. Even when the entire range is used (with the JEW analog-to-digital conversion of Eq. 7) values will still be clipped and saturated at 0 and 255. Note that while 8-bit depth content was used in the analysis presented above, issues will always arise with clipping and saturation (note that the terms saturated, saturation, and clipped may be used interchangeably herein). Higher bit-depth content such as 10 or 12-bit content, for example, will also suffer from the same issues. Embodiments of the present invention apply irrespective to the content bit-depth and the color space (e.g. XYZ, YCbCr, YCgCo, etc.). The clipping and saturation operations can be detrimental to prediction efficiency of global weighted prediction. Furthermore, they also hinder the search for the best global and local weighted prediction parameters (gain and offset). The operation of two widely used weighted prediction search methods is discussed below in cases with saturated pixel values.

Figure 12:
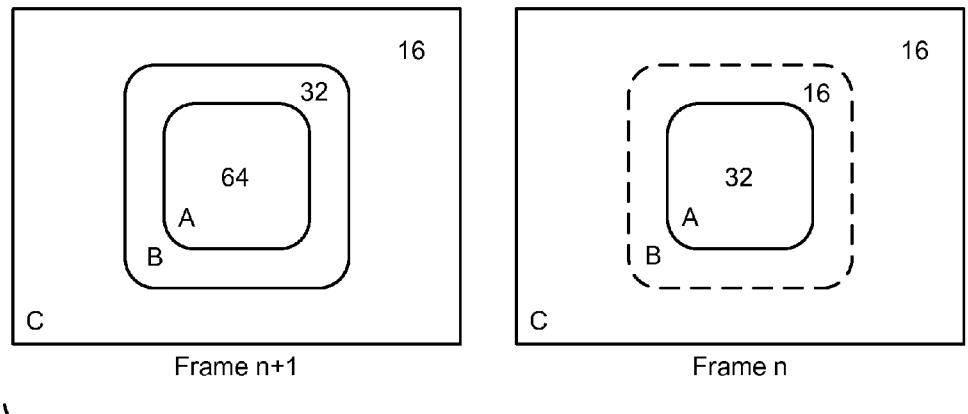
FIG. 12 shows a global illumination example with saturated background with a fade-in from black.

FIG. 12 illustrates a case of global illumination change. The background C is dark and stays dark: it is clipped at a value 16. In FIG. 12, assume that these numbers represent the values of the Y' component. A first part A of an object is slightly visible with value 32 in frame n, and becomes even lighter in intensity with value 64 in frame n+1. Another part B of the same object with value 32 appears in frame n+1. Let partition C be equal to one-half of the frame. Let partitions A and B each be equal to one-fourth of the frame in area. It is also assumed that the content of partition C is very flat and hence can be coded with very few bits. In contrast, partitions A and B are textured and hence more difficult to code. This situation reflects a fade-in or fade-out of a logo, which is extremely common in movie trailers.

Global weighted prediction (offset f and gain w) may be used to predict frame n+1 using as a prediction reference frame n. The estimation of the gain and the offset can be done with DC based methods, iterative motion-compensation based methods, and histogram methods, among others. The description below presents the three existing DC-based techniques:

Technique 1: A first technique is to set the offset to 0 and calculate the gain as $DC_{n+1}/DC_n$.

Technique 2: A second technique is to set the gain to 1 and calculate the offset as $DC_{n+1}/DC_n$.

Technique 3: A third technique is to set the gain to $w=(E\{|I_{n+1}-DC_{n-1}|\})/(E\{|I_n-DC_n|\})$ and calculate the offset as $f=DC_{n+1}-w \times DC_n$. This technique is derived by addressing the problem as one of mean square minimization as described in K. Kamikura, et al, "Global Brightness-Variation Compensation for Video Coding" and Y. Kikuchi and T. Chujoh, "Interpolation coefficient adaptation in multi-frame interpolative prediction." The DC value is defined as $DC_n=E\{I_n\}$, where $I_n$ is the value of a pixel in frame n, and the operation $E\{X\}$ represents the mean value of X.

The outcomes of estimating the gain and offset with the above techniques and employing them for illumination change compensation are described below.

Technique 1: Using Technique 1, (w,f)=(1.2,0) is obtained. Applying global illumination compensation with these parameters on reference frame n, Partitions B and C have values of 19.2 and partition A has a value of 38.4. Hence, all partitions are mispredicted.

Technique 2: Using Technique 2, (w,f)=(1.0,4) is obtained. Applying global illumination compensation with these parameters on reference frame n, Partitions B and C have value 20 and partition A has a value of 36. Hence, all partitions are mispredicted. Since partition A is more difficult to code, it can be concluded that Technique 1 outperforms Technique 2 for this prediction situation.

Technique 3: Using Technique 3, (w,f), (2.67,−29.34) is obtained. Applying global illumination compensation with these parameters on reference frame n, Partitions B and C have value 2.66 and partition A has a value of 56.1. Hence, all partitions are mispredicted. Since partitions A and B are more difficult to code than C, there is no conclusion in regard to Technique 3's performance relative to Techniques 1 and 2 for this prediction situation.

From the above analysis, it becomes evident that these three DC-based techniques cannot address a transition close to the clipping/saturation values. In fact, while the description above presents a fade-in from black that is initially saturated at 16, identical conclusions will be established if one studies a fade-out to black that saturates at 16 or 0, or a fade-out to white that saturates at 255 or 240. Similar conclusions are valid for either higher bit-depths or different color spaces. In general, weighted parameter estimation suffers when operating close to the saturation points, e.g., the minimum and maximum of the luma and chroma dynamic range. In this description, these saturation values can be generalized as 1, and $h_s$, which are not necessarily non-zero (a zero is still a saturation point as values are clipped to be no less than that). In the following subsections, two algorithms are discussed that can address the problem of global weighted prediction at the edges of fades where saturation of pixel values is commonplace.

Algorithm Based on Labeled Sets.

This algorithm is based on labeling pixel positions that belong to pixels that:

(a) Either were saturated for frame n−1 and take an unsaturated value at frame n, e.g., pixel values were saturated at the lowest saturation value $I_{n-1}=1$, or the highest saturation value $I_{n-1}=h_s$ and now they are larger than the lowest saturation value $I_{n-1}>1$, or smaller than the largest saturation value $I_{n-1}<h_s$, respectively;

(b) Or were unsaturated for frame n−1 and take a saturated value at frame n, e.g., pixel values were larger than the lowest saturation value $I_{n-1}>1$, or smaller than the largest saturation value $I_{n-1}<h_s$ and are now saturated at the lowest saturation value $I_{n-1}=1$, or the highest saturation value $I_{n-1}=h_s$, respectively.

Figure 13:
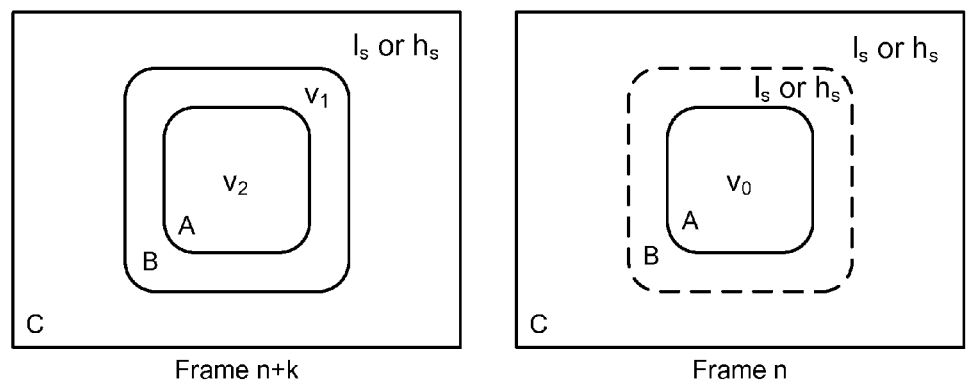
FIG. 13 shows a generic global illumination example with a saturated background.

In FIG. 13, for frame n+k, partition C stays saturated, while partition B is initially saturated and then takes unsaturated values (in frame n+k). Partition A is defined as the set of partitions whose values are unsaturated in both the predicted frame and the reference frame. Partition D is defined as the set of partitions whose values are unsaturated for the given frame. Note that in contrast to the illustration shown in FIG. 13, the partitions need not be contiguous. They may comprise multiple regions as long as they obey the conditions described above. To generalize this into fade-ins and fade-outs to both to and from white and black (or any other uniform color), assume that k is any non-zero integer. So depending on the situation, frame n can serve as either the current frame or the prediction reference. The opposite is true for frame n+k. It is worth noting that $A_{n+k}=D_{n+k} \cap D_n$. Note also that $D_{n+k}=A_{n+k} \oplus B_{n+k}$.

Figure 14:
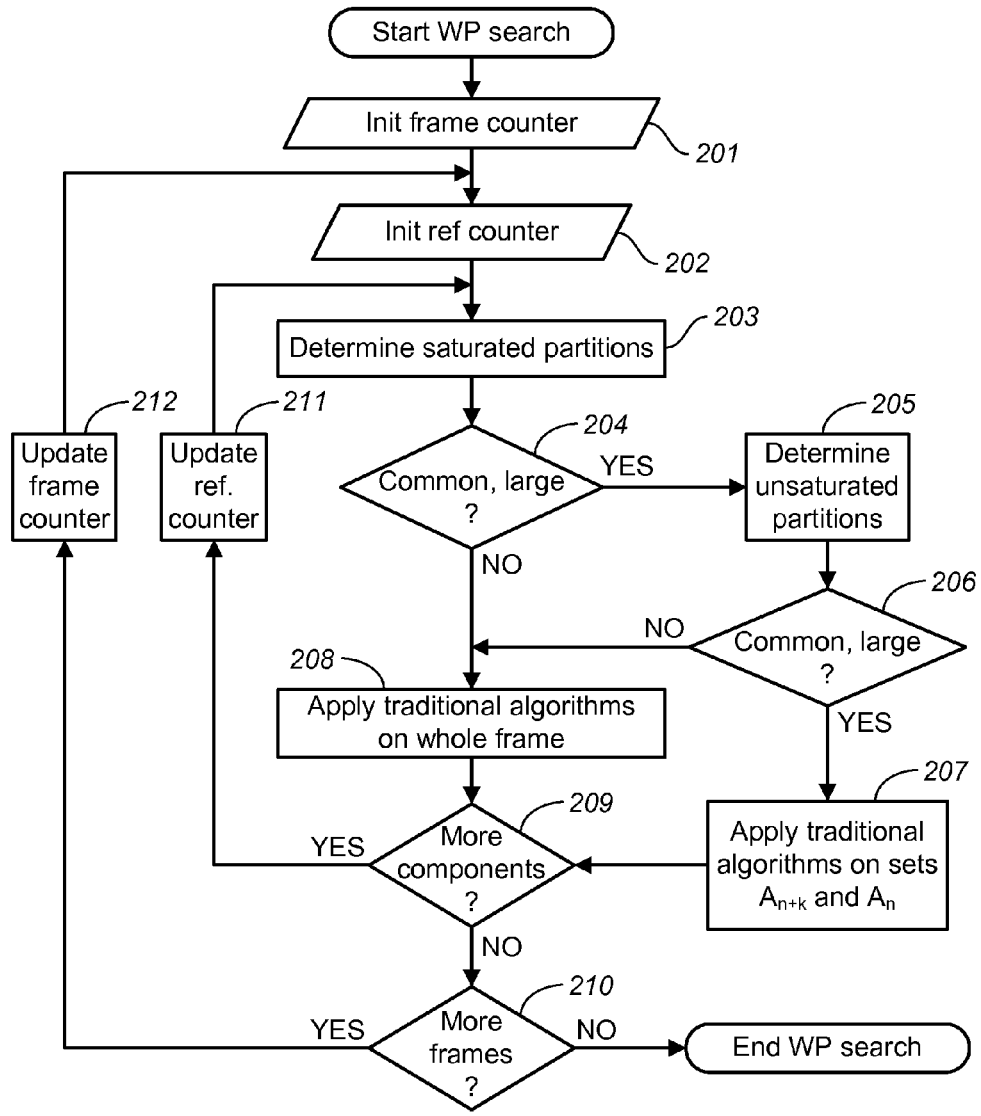
FIG. 14 shows a flowchart of an algorithm for WP parameter search based on labeled sets.

The algorithm for WP parameter search based on labeled sets is shown in FIG. 14 (step numbers refer to label numbers shown in the figure) and is described in additional detail below:

(a) Step 201: For each predicted frame and reference frame pair, initialize the frame number and go to step 202;

(b) Step 202: For each predicted frame and reference frame pair, initialize the reference counter and go to step 203;

(c) Step 203: Determine saturated partitions, if any, within each predicted frame and reference frame pair and go to Step 204;

(d) Step 204: Determine if both frames share large areas with saturated luminance values. This can be done with existing methods or alternatively by testing and classifying pixels accordingly in the frames. If yes, go to Step 205; otherwise go to Step 208;

(e) Step 205: Determine unsaturated partitions, if any, within each predicted frame and reference frame pair, and go to step 206;

(f) Step 206: Determine if both frames share a large common area with unsaturated values ($A_{n+k} \approx A_n$). Existing methods or per-pixel testing and classification may be used for this task. If yes, go to Step 207; otherwise go to Step 208;

(g) Step 207: Apply some WP search method (DC-based methods, histogram-based methods, iterative methods with motion estimation and compensation, among others) on normalized (to the same number of pixels) sets $A_{n+k}$ and $A_n$. Re-use WP parameters from previous frames to initialize search for the current. Obtain gain and factor. Go to Step 209;

(h) Step 208: Apply some WP search method (DC-based methods, histogram-based methods, iterative methods with motion estimation and compensation, among others) on normalized (to the same number of pixels) frames n and n+k. Re-use WP parameters from previous frames to initialize search for the current. Obtain gain and factor. Go to Step 209;

(i) Step 209: Determine if additional components are to be analyzed, if so, update the reference counter (Step 211) and go to Step 203, otherwise go to Step 210;

(j) Step 210: If more predicted frame and reference frame pairs have to be evaluated, select one, store the WP parameters derived for the current frame pair, update the frame counter (Step 212) and go to Step 202; otherwise terminate the algorithm.

Additional Embodiments

The derivation of the saturated and unsaturated regions could benefit from the use of segmentation methods. Motion compensation could also be used to track these regions from one frame to the next and thus serve as seeds for the formation of partitions A, B, C, and D that are vital components of these methods. In an alternative embodiment, instead of applying WP parameter estimation methods on partitions A as if they represent the same single region, segmentation can categorize them into different objects and the algorithms can be applied separately one each object/region. In one embodiment, weighted prediction on a local basis with the above method is possible if the codec supports signaling WP gains and factors on a macroblock, block or region level. Regions or blocks may be overlapping. For embodiments that employ codecs such as H.264 that only support signaling WP parameters on a slice level, use of different WP parameters on a local level is possible through the joint use of multiple reference motion-compensated prediction and reference reordering/modification. In a different embodiment, the above methods may be incorporated into a pre or post-processing module that may also involve motion estimation and compensation (a motion-compensated temporal pre or post-filter) in combination with weighted prediction.

Algorithm Based on Iterative Elimination.

This algorithm addresses the problem of saturated values differently. Furthermore, it addresses a major issue of the previous algorithm, the increased complexity in terms of branching operations. The determination of the common set cross-section $A_{n+k}=D_{n+k} \cap D_n$ may sound straightforward, but requires per-pixel conditional branches in order to determine those sets. Furthermore, even after the determination of those sets, and depending on the weighted parameters estimation algorithm, one still needs to calculate DC values anew, for the resulting sets. For certain WP search methods such as complex technique 3, this also entails per-pixel summation that again has to be constrained for the particular set. Therefore, a different algorithm that is based on histograms and multiple iterations may be useful. Note that this algorithm is amenable to application to weighted parameter estimation techniques such as DC-based methods, histogram-based methods, iterative methods with motion estimation and compensation, among others.

In the algorithm based on iterative elimination, let frame n be the current frame and frame n+k be the reference frame used for weighted prediction. The reference frame can either be the original frame or the decompressed frame after reconstruction of the compressed residuals. The following parameters may be initialized as follows:

(a) The current iteration number t=0;

(b) The current lowest saturation value $l_{s,t}{}^n=l_{s,0}{}^n=l_s$ for the current frame n;

(c) The current highest saturation value $h_{s,t}{}^n=h_{s,0}{}^n=h_s$ for the current frame n;

(d) The current lowest saturation value is $l_{s,t}{}^{n+k}=l_{s,0}{}^{n+k}=l_s$ for the reference frame n+k;

(e) The current highest saturation value $h_{s,t}{}^{n+k}=h_{s,0}{}^{n+k}=h_s$ for the reference frame n+k;

Let the current iteration number be t. The algorithm may optionally first calculate the histograms of both frames. This operation is of low complexity as it avoids per-pixel branches and replaces them with per-pixel matrix memory accesses, which are in general faster to implement since a 256-element matrix can easily fit into any processor's cache memory. Such an optional calculation is useful for WP search methods that depend, e.g., on histogram matching or on DC values. The next step involves estimation of the weighted parameters (WP search) that predict frame n using as reference frame n+k. The WP search may consider DC-based methods, histogram-based methods (e.g., histogram matching), iterative methods with motion estimation and compensation, among others. Furthermore, WP parameters derived at iteration t−1 may be used to improve and speed up WP search at iteration t.

The WP search may also consider algorithms that employ histograms to determine offsets and gains. These histograms may now be constrained through the parameters $l_{s,t}{}^m$ and $h_{s,t}{}^m$ for a given frame m. In general, a novelty of the method is that WP search at each iteration is constrained to consider the pre-determined lowest and highest saturation bounds for the current and the reference frame.

After the estimation of the weighted prediction parameters is complete, the bounds parameters $l_{s,t}^m$ and $h_{s,t}^m$ have to be updated. In general, the parameters of the current frame $l_{s,t}^n$ and $h_{s,t}^n$ stay unchanged regardless of the iterations. Hence, $l_{s,t}^n = l_{s,t+1}^n$ and $h_{s,t}^n = h_{s,t+1}^n$. The parameters of the reference frame $l_{s,t}^{n+k}$ and $h_{s,t}^{n+k}$ though are updated with an algorithm such as the one described in the following paragraph.

In the algorithm for updating the parameters of the reference frame, let $(w_t, f_t)$ denote the offset and gain determined by the weighted prediction estimation algorithm. The parameters that will be used for the next iteration: is $l_{s,t+1}^{n+k}$ and $h_{s,t+1}^{n+k}$ can be determined by satisfying the following inequalities shown in Eq. 47:

$$l_{s,0}^n < w_t \times p_{n+k} + f_t < h_{s,0}^n \Rightarrow \frac{l_{s,0}^n - f_t}{w_t} < p_{n+k} < \frac{h_{s,0}^n - f_t}{w_t} \quad \text{Eq. 47}$$

Let $p_{n+k}$ be any pixel value in the reference frame n+k. Pixel values that will be saturated or clipped with the newly derived gain and offset are marked as undesirable. In general, the updating algorithm according to an embodiment of the present invention will set the lower and upper bounds for the reference frame in such a way so that when weighted prediction is used to predict the current frame from the reference frame, the resulting pixel values will not be saturated or clipped. Hence, from the above equation, the new saturation bounds for the next iteration t+1 are determined as shown in Eq. 48 below:

$$l_{s,t+1}^{n+k} = \frac{l_{s,0}^n - f_t}{w_t} + 1$$

$$h_{s,t+1}^{n+k} = \frac{h_{s,0}^n - f_t}{w_t} - 1 \quad \text{Eq. 48}$$

Figure 15:
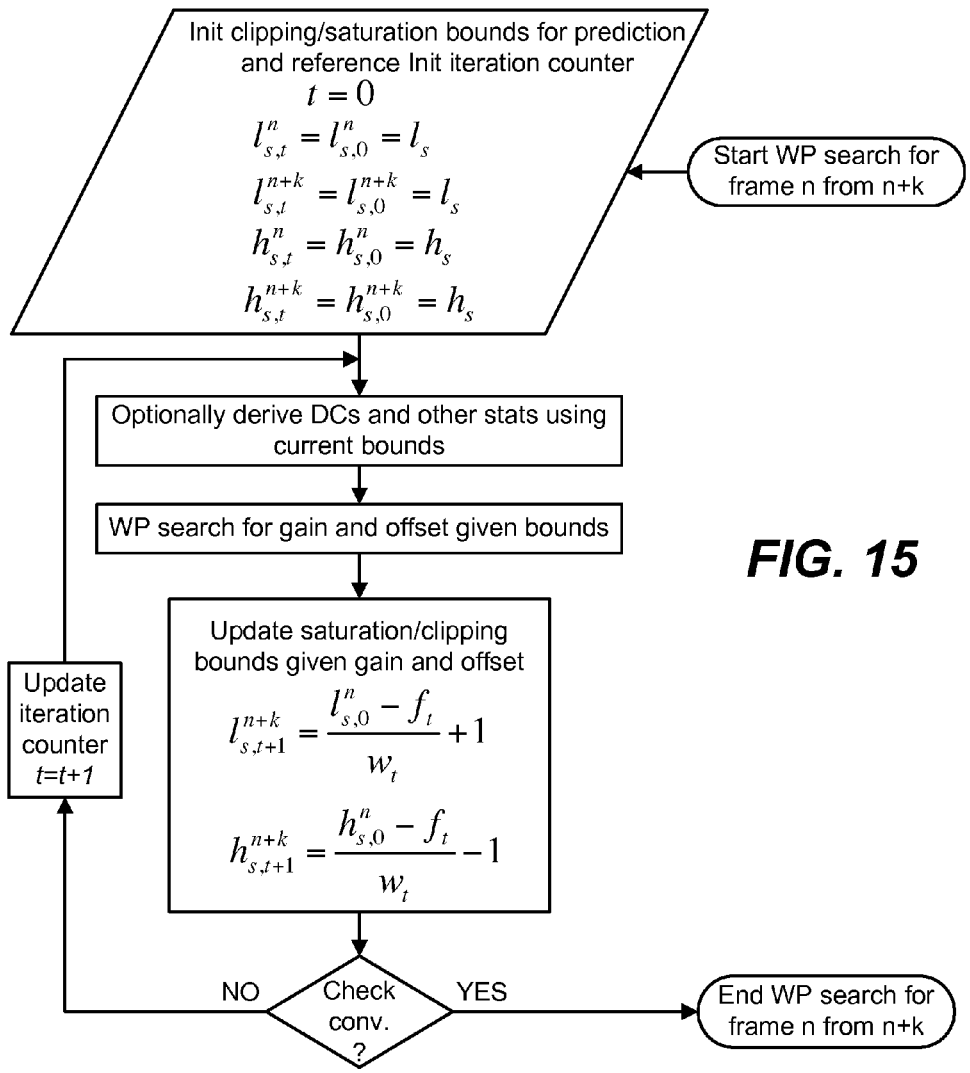
FIG. 15 shows a flowchart of an algorithm for WP search using iterative elimination.

Next, it is determined whether the gain and offset $(w_t, f_t)$ is sufficiently different, e.g. assuming 8-bit content and real-valued gains that the absolute gain difference is more than 0.03 and the absolute offset difference is more than 3, from those of the previous iteration $(w_{t-1}, f_{t-1})$. If they are not, then the algorithm has converged and the weighted parameters estimation terminates. The algorithm also terminates if a maximum number of iterations has been reached. Otherwise, the iteration counter is incremented to t+1, and execution returns back to the estimation of the weighted parameters $(w_{t+1}, f_{t+1})$. This algorithm is illustrated in FIG. 15.

Additional Embodiments

This embodiment of the present invention may also be augmented by considering segmented regions that correspond to different objects or content in the scene. After segmentation and derivation of the regions, one may apply the above method on each region separately. Motion compensation can aid in terms of tracking. The above method considers a single component of the color space. Better performance can be obtained if the impact of each gain and offset selection is considered in the entire color space at the same time. There can be cases where two of the components will be unsaturated, but the last may exhibit saturation issues. Furthermore, and more importantly, it may also consider the impact to sample values after they undergo a color space conversion: for example, while the samples values may be unsaturated in the initial color space used for compression, e.g. Y'CbCr, saturated values may result in one or more of the components after converting the samples to another color space, e.g., RGB, for the purpose of display or, e.g., inter-layer prediction (in the case of scalable coding with high-dynamic range samples in the enhancement layer). The algorithm can take this into account and constrain the bounds even on the unsaturated color space components. In one embodiment, weighted prediction on a local basis with the above method is possible if the codec supports signaling WP gains and factors on a macroblock or block level. For embodiments that employ codecs such as H.264 that only support signaling WP parameters on a slice level, use of different WP parameters on a local level is possible through the joint use of multiple reference motion-compensated prediction and reference reordering/modification. In a different embodiment, the above methods may be incorporated into a pre or post-processing module that may also involve motion estimation and compensation (a motion-compensated temporal pre or post-filter) in combination with weighted prediction.

Low Complexity Estimation of Illumination Compensation Parameters.

Previously proposed methods for WP parameter estimation have a characteristic in common: all three of them operate on a single color component. Hence the offset and gain for, say, Y' is computed without any regard to the result for the Cb and Cr component. Similarly, the offset and gain for the G component will be computed irrespective of the R and B component. The discussion above, though, has shown that there are lots of relationships based on the fading type. The following problem may be formulated: the DC values of the RGB and Y'CbCr components are known for the current frame m and the reference frame m+k where k is any non-zero integer. In addition, assume global illumination change. The gains and offsets to perform weighted prediction are then sought. In general, doing so always leads to three equations with six unknowns (e.g., Eq. 10 and Eq. 11), which yield infinite solutions. However, a reliable and unique solution can be obtained if certain constraints are imposed so that the number of unknowns becomes equal to the number of equations. The constraints/assumptions can be a result of a priori knowledge. Multiple solutions may be generated, corresponding to multiple assumptions/constraints and then the best solution may be selected by performing a consistency/sanity check (disregarding solutions for values that are out of bounds or irrational).

One solution is possible if the weights are constrained to be equal across all components, e.g., for Y'CbCr, which is usually true for most fade scenarios. In addition, the chroma offsets are set to be equal as shown in Eq. 49 below:

$$\begin{bmatrix} Y'_m \\ Cb_m \\ Cr_m \end{bmatrix} = w \times \begin{bmatrix} Y'_{m+k} \\ Cb_{m+k} \\ Cr_{m+k} \end{bmatrix} + \begin{bmatrix} f_{Y'} \\ f_C \\ f_C \end{bmatrix} \quad \text{Eq. 49}$$

Eq. 48 can then be solved to derive the gain w, and the offsets $f_{Y'}$ and $f_C$.

Another embodiment is possible in the RGB domain (but is not limited to just these two domains). The RGB offsets are set to be equal, while the gains can be constrained as shown in Eq. 50 below:

$$\begin{bmatrix} R_m \\ G_m \\ B_m \end{bmatrix} = \begin{bmatrix} w_R \times R_{m+k} \\ w \times G_{m+k} \\ w \times B_{m+k} \end{bmatrix} + \begin{bmatrix} f \\ f \\ f \end{bmatrix} \quad \text{Eq. 50}$$

An alternative derivation may be as shown in Eq. 51 below:

$$\begin{bmatrix} R_m \\ G_m \\ B_m \end{bmatrix} = \begin{bmatrix} w \times R_{m+k} \\ w_G \times G_{m+k} \\ w \times B_{m+k} \end{bmatrix} + \begin{bmatrix} f \\ f \\ f \end{bmatrix} \quad \text{Eq. 51}$$

The above systems of equations are solvable and the gains and offsets can then be converted into the Y'CbCr domain to be used within prediction schemes that operate in the Y'CbCr domain. The decision on where to do the calculations, namely either the RGB or the Y'CbCr domain, depends on what a priori knowledge exists about the sequence: if most processing was done in the RGB domain then it makes sense to perform estimation in that domain. The opposite is true if processing was done in the Y'CbCr domain.

Additional Embodiments

The above methods can be applied on a global (whole frame or component) or local basis perhaps through segmentation that precedes the main method and derives regions with content that has more uniform characteristics. The, e.g., DC values could thus be computed on a region/local basis. In one embodiment, weighted prediction on a local basis with the above method is possible if the codec supports signaling WP gains and factors on a macroblock or block level. For embodiments that employ codecs such as H.264 that only support signaling WP parameters on a slice level, use of different WP parameters on a local level is possible through the joint use of multiple reference motion-compensated prediction and reference reordering/modification. In a different embodiment, the above methods may be incorporated into a pre or post-processing module that may also involve motion estimation and compensation (a motion-compensated temporal pre or post-filter) in combination with weighted prediction.

In summary, according to several embodiments, the present disclosure considers data enhancement or processing systems and methods, such as in-loop (part of the encoding/decoding process) or out of loop (pre-processing or post-processing stage) processing, such as deblocking and denoising, for data that may have been sampled and multiplexed with a variety of methods. These systems and methods can be applied to existing codecs (encoders and decoders), but can also extend to future encoders and decoders by also providing modifications to core components. Applications could include Blu-ray video encoders and players, set-top boxes, software encoders and players but also broadcast and download solutions which are more bandwidth-constrained. Additional applications include BD video encoders, players, and video discs created in the appropriate format, or even content and systems targeted for other applications such as broadcast, satellite, and IPTV systems, etc.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

As described herein, an embodiment of the present invention may thus relate to one or more of the example embodiments, which are enumerated in Table 1, below. Accordingly, the invention may be embodied in any of the forms described herein, including, but not limited to the following Enumerated Example Embodiments (EEEs) which described structure, features, and functionality of some portions of the present invention.

Table 1

Enumerated Example Embodiments

EEE1. A method for fade detection and determination of global or local nature of the fade in a transition from one picture to a next picture of a video signal, the method comprising:
  providing a plurality of frames of a picture and related prediction reference frames;
    for each frame and related prediction reference frame; calculating one or more intensity related values and one or more color related values in a first color domain;
    for each frame and related prediction reference frame, calculating weighted prediction gains for each component value in the first color domain;
    if the weighted prediction gains are all non-negative and substantially similar to each other, then determining that a global transition with zero offset is primarily occurring in a second color domain; and,
    if the weighted prediction gains are not all non-negative and substantially similar to each other, then determining that at least one of the following is not occurring: a global fading transition; a global fading transition with zero offset; or a global fading transition with zero offset in the second color domain.

EEE2. The method of Enumerated Example Embodiment 1, wherein the intensity related values comprise one or more of a luma value or a luminance value.

EEE3. The method of Enumerated Example Embodiment 1, wherein the color related values comprise one or more of a chroma value or a chrominance value.

EEE4. The method of Enumerated Example Embodiment 1, wherein the first color domain is the YCbCr domain and the weighted prediction gains are computed according to the following formula:

$$w_Y = \frac{Y'_m - d_0}{Y'_{m+k} - d_0}, w_{Cb} = \frac{Cb_m - d_1}{Cb_{m+k} - d_1}, w_{Cr} = \frac{Cr_m - d_2}{Cr_{m+k} - d_2}$$

where $Y'_m$ and $Y'_{m+k}$ are luma components of a frame and a prediction reference frame of the frame;

$Cb_m$ and $Cr_m$ are chroma component values of the frame;

$Cb_{m+k}$ and $Cr_{m+k}$ are chroma component values of the prediction reference frame of the frame, and $d_0$, $d_1$ and $d_2$ are color format conversion offsets EEE5. The method of Enumerated Example Embodiment 1, wherein the intensity related and color related values are average intensity related and color related values.

EEE6. The method of Enumerated Example Embodiment 1, wherein the intensity related and color related values are computed from histogram information.

EEE7. The method of Enumerated Example Embodiment 1, wherein the plurality of frames are part of a frame sequence.

EEE8. The method of Enumerated Example Embodiment 1, wherein the plurality of frames are part of a set of frames indicated to have illumination changes.

EEE9. The method of Enumerated Example Embodiment 1, wherein a color space matrix defining a transition from the first color domain to the second color domain is linear.

EEE10. The method of Enumerated Example Embodiment 1, wherein the weighted prediction gains are substantially similar if the gains are within 5% to 10% of each other.

EEE11. The method of Enumerated Example Embodiment 1, further comprising:

logarithmically scaling the weighted prediction gains are to have values between 0 and 1, and determining whether the gains are substantially similar by calculating whether differences between the weighted prediction gains values are less than 0.1

EEE12. A method for fade detection and determination of global or local nature of the fade in a transition from one picture to a next picture of a video signal, the method comprising:

providing a plurality of frames of a picture and related prediction reference frames;

for each frame and related prediction reference frame, calculating intensity related and color related values in a first color domain;

for each frame and related prediction reference frame, calculating intensity related weighted prediction parameters;

for each frame and related prediction reference frame, calculating weighted prediction gains from computed intensity related and color related values and from computed intensity related weighted prediction parameters;

if the weighted prediction gains are all non-negative and substantially similar to each other, then determining that a global transition with zero offset is primarily occurring in a second color domain; and, if the weighted prediction gains are not all non-negative and substantially similar to each other, testing if a local transition is occurring.

EEE13. The method of Enumerated Example Embodiment 12, wherein the intensity related values comprise one or more of a luma value or a luminance value.

EEE14. The method of Enumerated Example Embodiment 13, wherein the color related values comprise one or more of a chroma value or a chrominance value.

EEE15. The method of Enumerated Example Embodiment 12, wherein the first color domain is the YCbCr domain and the weighted prediction gains are computed according to the following formula:

$$w_Y = \frac{Y'_m - d_0}{Y'_{m+k} - d_0}, \quad w_{Cb} = \frac{Cb_m - d_1}{Cb_{m+k} - d_1}, \quad w_{Cr} = \frac{Cr_m - d_2}{Cr_{m+k} - d_2}$$

where $Y'_m$ and $Y'_{m+k}$ are luma components of a frame and a prediction reference frame of the frame;

$Cb_m$ and $Cr_m$ are chroma component values of the frame;

$Cb_{m+k}$ and $Cr_{m+k}$ are chroma component values of the prediction reference frame of the frame, and $d_0$, $d_1$ and $d_2$ are color format conversion offsets.

EEE16. The method of Enumerated Example Embodiment 12, wherein the intensity related and color related values are average intensity related and color related values.

EEE17. The method of Enumerated Example Embodiment 12, wherein the intensity related and color related values are computed from histogram information.

EEE18. The method of Enumerated Example Embodiment 12, wherein the plurality of frames is part of a frame sequence.

EEE19. The method of Enumerated Example Embodiment 12, wherein the plurality of frames is part of a set of frames indicated to have illumination changes.

EEE20. The method of Enumerated Example Embodiment 12, wherein a color space matrix defining a transition from the first color domain to the second color domain is linear.

EEE21. The method of Enumerated Example Embodiment 12, wherein the weighted prediction gains are substantially similar if the gains are within 5% to 10& of each other.

EEE22. The method of Enumerated Example Embodiment 12, further comprising:

logarithmically scaling the weighted prediction gains are to have values between 0 and 1, and determining whether the gains are substantially similar by calculating whether differences between the weighted prediction gains values are less than 0.1

EEE23. A method for determination of global or local nature of a fade in a transition from a picture to a next picture of a video signal, the method comprising:

providing a plurality of frames of the picture and related prediction reference frames;

for each frame and related prediction reference frame, calculating intensity related and color related values in a first color domain;

for each frame and related prediction reference frame, calculating weighted prediction gains for each intensity related and color related value in the first color domain;

for each frame and related prediction reference frame, comparing the weighted prediction gains with each other;

if the weighted prediction gains are all non-negative and substantially similar to each other, determining that the fade is global; and if the weighted prediction gains are not all non-negative and substantially similar to each other, determining that the fade is local.

EEE24. The method of Enumerated Example Embodiment 23, wherein the intensity related values comprise one or more of a luma value or a luminance value.

EEE25. The method of Enumerated Example Embodiment 23, wherein the color related values comprise one or more of a chroma value or a chrominance value.

EEE26. A method for calculating second and third color component weighted prediction parameters from information about color space conversion and first color component weighted prediction parameters when an image transition occurs, the method comprising:

calculating the first color component weighted prediction gain and offset; and based on values of the computed first color component weighted prediction gain and offset, calculating the second and third color component weighted prediction gains and offsets as functions of the color conversion offsets, coefficients of a color conversion matrix, and the first color component weighted prediction gain and offset.

EEE27. The method according to Enumerated Example Embodiment 26, wherein the second and third color component weighted prediction parameters comprise color related gains and offsets, and the first color component weighted prediction parameters comprise an intensity related gain and offset, and the image transition comprises a fade, wherein the method comprises:
  calculating intensity related gain and offset;
  if the intensity related gain is not unity and intensity related offset is non-zero, then setting color related gains equal to intensity related gain and calculating color related offsets as functions of color format conversion offsets, intensity related gain, intensity related offset, and coefficients of color conversion matrix;
  if intensity related gain is not unity and intensity related offset is zero, then setting color related gains equal to the intensity related gain and calculating color related offsets as functions of color format conversion offsets, intensity related gain, and coefficients of color conversion matrix; and
  if intensity related gain is unity and intensity related offset is non-zero, then setting color related gains equal to 1 and calculating color related offsets as functions of intensity related offset and coefficients of color conversion matrix.

EEE28. The method of Enumerated Example Embodiment 27, wherein the intensity related gain and offset comprise luma gain and offset.

EEE29. The method of Enumerated Example Embodiment 27, wherein the color related gains and offsets comprise chroma gains and offsets.

EEE30. The method according to Enumerated Example Embodiment 27, wherein the color space conversion is RGB to Y'CbCr and if intensity related gain is not equal to unity and intensity related offset is zero, then color related offsets are computed according to the following formula:

$$f_{Cb}=(c_{10}+c_{11}+c_{12})\times(w_Y-1)\times d_0+(1-w_Y)\times d_1$$

$$f_{Cr}=(c_{20}+c_{21}+c_{22})\times(w_Y-1)\times d_0+(1-w_Y)\times d_2$$

where $f_{Cb}$ and $f_{Cr}$ are the chroma offsets;
$c_{10}$, $c_m$, $c_{12}$, $c_{20}$, $c_m$ and $c_{22}$ are coefficients of the color conversion matrix;
$w_Y$ is luma gain; and
$d_0$, $d_1$, and $d_2$ are the color format conversion offsets.

EEE31. The method according to Enumerated Example Embodiment 27, wherein the color space conversion is RGB to Y'CbCr and if intensity related gain is unity and intensity related offset is non-zero, then color related offsets are computed according to the following formula:

$$f_{Cb}=f_Y\times(c_{10}+c_{11}+c_{12})$$

$$f_{Cr}=f_Y\times(c_{20}+c_{21}+c_{22})$$

where $f_{Cb}$ and $f_{Cr}$ are the chroma offsets;
$f_Y$ is luma offset; and
$c_{10}$, $c_{11}$, $c_{12}$, $c_{20}$, $c_{21}$ and $c_{22}$ are coefficients of the color conversion matrix.

EEE32. The method according to Enumerated Example Embodiment 27, wherein the color space conversion is RGB to Y'CbCr and wherein if intensity related gain is not unity and intensity related offset is non-zero, then color related offsets are computed according to the following formula:

$$f_{Cb}=(f_Y-(1-w_Y)d_0)\times(c_{10}+c_{11}+c_{12})+(1-w_Y)\times d_1$$

$$f_{Cr}=(f_Y-(1-w_Y)d_0)x\times(c_{20}+c_{21}+c_{22})+(1-w_Y)\times d_2$$

where $f_{Cb}$ and $f_{Cr}$ are chroma offsets;
$c_{10}$, $c_{11}$, $c_{12}$, $c_{20}$, $c_{21}$ and $c_{22}$ are coefficients of the color conversion matrix;
$w_Y$ is luma gain;
$f_Y$ is luma offset; and
$d_0$, $d_1$, and $d_2$ are the color format conversion offsets.

EEE33. The method according to Enumerated Example Embodiment 27, wherein the color space conversion is RGB to Y'CbCr, wherein the intensity related gain and offset comprise luma gain and offset and wherein color related gains and offsets comprise chroma gains and offsets and wherein $d_0$, $d_1$, and $d_2$ are color format conversion offsets, $f_Y$ is luma offset and $w_Y$ is luma gain, wherein if the luma offset is non-zero and the luma gain is not unity and if $f_Y$ is approximately equal to $(1-w_Y)d_0$; then chroma gains are equal to luma gain and chroma offsets are computed according to the following formula:

$$f_{Cb}=(1-w_Y)\times d_1$$

$$f_{Cr}=(1-w_Y)\times d_2'$$

where $f_{Cb}$ and $f_{Cr}$ are the chroma offsets.

EEE34. The method according to Enumerated Example Embodiment 33, wherein if $f_Y$ is not approximately equal to $(1-w_Y)d_0$; further comprising selecting one of options A, B, C, or D below:
  Option A: selecting luma gain as being reliable and calculating luma offset from the following formula:

$$f_Y=(1-w_Y)d_0;$$

checking $f_Y$ for reasonableness;
  setting chroma gains equal to luma gain;
  calculating chroma offsets according to the following formula:

$$f_{Cb}=(1-w_Y)\times d_1$$

$$f_{Cr}=(1-w_Y)\times d_2;$$

Option B: selecting luma offset as being reliable and calculating luma gain from the following formula:

$$w_Y=(d_0-f_Y)/d_0;$$

checking $w_Y$ for reasonableness;
  setting chroma gains equal to luma gain;
  calculating chroma offsets according to the following formula:

$$f_{Cb}=(1-w_Y)\times d_1$$

$$f_{Cr}=(1-w_Y)\times d_2$$

Option C: selecting luma gain as reliable and setting luma offset equal to zero;
  setting chroma gains equal to luma gain;
  calculating chroma offsets according to the following formula:

$$f_{Cb}=(c_{10}+c_{11}+c_{12})\times(w_Y-1)\times d_0+(1-w_Y)\times d_1$$

$$f_{Cr}=(c_{20}+c_{21}+c_{22})\times(w_Y-1)\times d_0+(1-w_Y)\times d_2$$

where $c_{10}$, $c_{11}$, $c_{12}$, $c_{20}$, $c_{21}$, and $c_{22}$ are coefficients of the color conversion matrix;
  Option D: selecting luma offset as reliable and setting luma gain to unity;
  setting chroma gains equal to luma gain;
  calculating chroma offsets according to the following formula:

$$f_{Cb}=f_Y\times(c_{10}+c_{11}+c_{12})$$

$$f_{Cr}=f_Y\times(c_{20}+c_{21}+c_{22})$$

where $c_{10}$, $c_{11}$, $c_{12}$, $c_{20}$, $c_{21}$, and $c_{22}$ are coefficients of the color conversion matrix.

EEE35. The method according to Enumerated Example Embodiment 34, wherein one of Options A, B, C, or D is selected to satisfy a selected criterion.

EEE36. The method according to Enumerated Example Embodiment 35, wherein the selected criterion comprises minimizing or maximizing a selected metric or determining whether computed gains or offsets are within selected bounds.

EEE37. The method according to Enumerated Example Embodiment 35, wherein the selected criterion is based on a single chroma component or both chroma components.

EEE38. The method according to Enumerated Example Embodiment 27, wherein the intensity related and color related gains and offsets are computed from data for an entire image frame.

EEE39. The method according to Enumerated Example Embodiment 27, wherein the intensity related and color related gains and offsets are computed from data for a selected portion of an image frame EEE40. The method according to Enumerated Example Embodiment 27, wherein the color space conversion is RGB to Y'CbCr according to ITU/SMPTE or JFIF specifications, and wherein the intensity related gain and offset comprise luma gain and offset and wherein color related gains and offsets comprise chroma gains and offsets, the method comprising:

if luma gain is not unity, setting the chroma gains equal to the luma gain and
calculating chroma offsets according to the following formula:

$$f_{Cb} = f_{Cr} = (1 - w_Y) \times 128,$$

where $f_{Cb}$ and $f_{Cr}$ are the chroma offsets and $w_Y$ is the luma gain, and
if the luma gain is zero, then setting the chroma offsets to zero and setting the chroma gains equal to unity.

EEE41. The method according to Enumerated Example Embodiment 27, when an image cross fade occurs, the method further comprising:
calculating intensity related gain and luma offset, and
setting color related gains equal to intensity related gain.

EEE42. The method according to Enumerated Example Embodiment 27, wherein the first color component weighted prediction parameters comprise one of a pair of chroma gains and offsets and the second and third color component weighted prediction parameters comprise a second of the pair of chroma gains and offsets and luma gain and luma offset EEE43. A method for calculating color related parameters from intensity related parameters and information about color space conversion when an image flash occurs, the method comprising:
calculating intensity related gain and offset;
if intensity related gain is not unity and intensity related offset is non-zero, then setting color related gains equal to intensity related gain and calculating color related offsets as functions of color format conversion offsets, intensity related gain, intensity related offset, and coefficients of color conversion matrix;
if intensity related gain is not unity and intensity related offset is zero, then setting color related gains equal to the intensity related gain and calculating color related offsets as functions of color format conversion offsets, intensity related gain, and coefficients of color conversion matrix; and if intensity related gain is unity or close to unity, then setting color related gains equal to 1 and calculating color related offsets as functions of intensity related offset and coefficients of color conversion matrix.

EEE44. The method of Enumerated Example Embodiment 43, wherein the intensity related gain and offset comprise luma gain and offset.

EEE45. The method of Enumerated Example Embodiment 43, wherein the color related gains and offsets comprise chroma gains and offsets.

EEE46. The method according to Enumerated Example Embodiment 43, wherein if the intensity related gain is unity or close to unity, then calculating color related offsets comprises calculating color related offsets based on a color of the primary light source for the image flash.

EEE47. The method according to Enumerated Example Embodiment 43, wherein the color space conversion is RGB to Y'CbCr and wherein intensity related gain and offset comprise luma gain and offset and the color related gains and offsets comprise chroma gains and offsets and wherein if the luma gain is unity or close to unity, calculating the chroma offsets comprises selecting at least one of the following calculations:

$$f_{Cb} = 0 \text{ and } f_{Cr} = 0;$$

$$f_{Cb} = (c_{12} \times f_Y)/c_{02} \text{ and } f_{Cb} = (c_{22} \times f_Y)/c_{02};$$

$$f_{Cb} = (c_{11} \times f_Y)/c_{01} \text{ and } f_{Cb} = (c_{21} \times f_Y)/c_{01}, \text{ and}$$

$$f_{Cb} = (c_{10} \times f_Y)/c_{00} \text{ and } f_{Cb} = (c_{20} \times f_Y)/c_{00}$$

where $c_{00}$, $c_{01}$, $c_{02}$, $c_{10}$, $c_{11}$, $c_{12}$, $c_{20}$, $c_{21}$, and $c_{22}$ are coefficients of the color conversion matrix and $f_{Cb}$ and $f_{Cr}$ are the chroma offsets.

EEE48. The method according to Enumerated Example Embodiment 43, wherein the color space conversion is RGB to Y'CbCr and wherein intensity related gain and offset comprise luma gain and offset and the color related gains and offsets comprise chroma gains and offsets and wherein if the luma gain is unity or close to unity, calculating the chroma offsets comprises:
assuming the image flash comprises white light, and
calculating the chroma offsets $f_{Cb}$ and $f_{Cr}$ as follows:

$$f_{Cb} = 0 \text{ and } f_{Cr} = 0.$$

EEE49. The method according to Enumerated Example Embodiment 43, wherein the color space conversion is RGB to Y'CbCr and wherein intensity related gain and offset comprise luma gain and offset and the color related gains and offsets comprise chroma gains and offsets and wherein if the luma gain is unity or close to unity, calculating the chroma offsets comprises:
assuming the image flash comprises blue light, and
calculating the chroma offsets $f_{Cb}$ and $f_C$ as follows:

$$f_{Cb} = (c_{12} \times f_Y) c_{02} \text{ and } f_{Cb} = (c_{22} \times f_Y)/c_{02},$$

where $c_{02}$, $c_{12}$, and $c_{22}$ are coefficients of the color conversion matrix.

EEE50. The method according to Enumerated Example Embodiment 43, wherein the color space conversion is RGB to Y'CbCr and wherein intensity related gain and offset comprise luma gain and offset and the color related gains and offsets comprise chroma gains and offsets and wherein if the luma gain is unity or close to unity, calculating the chroma offsets comprises:
assuming the image flash comprises green light, and
calculating the chroma offsets $f_{Cb}$ and $f_C$ as follows:

$$f_{Cb} = (c_{11} \times f_Y)/c_{01} \text{ and } f_{Cb} = (c_{21} \times f_Y)/c_{01},$$

where $c_{01}$, $c_{11}$ and $c_{21}$, are coefficients of the color conversion matrix.

EEE51. The method according to Enumerated Example Embodiment 43, wherein the color space conversion is RGB to Y'CbCr and wherein intensity related gain and offset comprise luma gain and offset and the color related gains and offsets comprise chroma gains and offsets and wherein if the luma gain is unity or close to unity, calculating the chroma offsets comprises:

assuming the image flash comprises red light, and calculating the chroma offsets $f_{Cb}$ and $f_C$ as follows:

$$f_{Cb}=(c_{10} \times f_Y)/c_{00} \text{ and } f_{Cb}=(c_{20} \times f_Y)/c_{00}$$

where $c_{00}$, $c_{10}$, and $c_{20}$, are coefficients of the color conversion matrix.

EEE52. The method according to Enumerated Example Embodiment 47, wherein more than one calculation is selected and a solution from one of the calculations is chosen based on a selected criterion.

EEE53. The method according to Enumerated Example Embodiment 47, wherein a calculation is selected based on information regarding a previous frame.

EEE54. A method for fade detection in a transition from one scene to a next scene of a video signal, the method comprising the following steps:

Step A: providing a plurality of frames from the video signal;

Step B: selecting a current frame of the plurality of frames;

Step C: calculating a set of properties for one or more color space components of the current frame based on the frame values of one or more color components of frames preceding the current frame and frames following the current frame;

Step D: calculating a set of properties for one or more color space components of a preceding frame preceding the current frame based on the frame values of one or more color components of frames preceding the preceding frame and frames following the preceding frame; and, Step E: comparing the set of properties for the one or more color space parameters of the current frame to the set of properties for the one or more color space parameters of the preceding frame to determine whether the current frame is an end frame of a fade with an increasing or decreasing frame value or if the frame preceding the current frame is a start frame of fade with an increasing or decreasing frame value.

EEE55. The method according to Enumerated Example Embodiment 54, wherein frame m designates a selected frame in the plurality of frames, frame m−1 designates a frame in the plurality of frames preceding frame m, frame m−2 designates a frame in the plurality of frames preceding frame m−1, frame m+1 designates a frame in the plurality of frames following frame m, and frame m+2 designates a frame in the plurality of frames following frame m+1, and wherein calculating a set of properties for one or more color components comprises calculating the following properties:

property A, wherein a property A frame value of frame m is equal to an average of the frame values of frame m+1 and frame m−1;

property B, wherein a property B frame value of frame m is equal to two times the frame value of frame m+1 minus the frame value of frame m+2;

property C; wherein a property C frame value of frame m is equal to a property C dividend divided by a property C divisor, wherein the property C dividend is equal to two times the frame value of frame m−1 plus the frame value of frame m+2 and the property C divisor is 3;

property D, wherein a property D frame value of frame m is equal to two times the frame value of frame m−1 minus the frame value of frame m−2; and property E; wherein a property E frame value of frame m is equal to a property E dividend divided by a property E divisor, wherein the property E dividend is equal to two times the frame value of frame m+1 plus the frame value of frame m−2 and the property E divisor is 3.

EEE56. The method according to Enumerated Example Embodiment 54, wherein comparing the set of properties for the one or more color space parameters of the current frame to the set of parameters for the one or more color space parameters of a preceding frame comprises testing for at least one of the following conditions:

condition 1, where condition 1 is satisfied if the property C frame value of the current frame is greater than the property A frame value of the current frame and the property A frame value of the current frame is greater than the property B frame value of the current frame and the property C frame value of the preceding frame is greater than the property A frame value of the preceding frame and the property A frame value of the preceding frame is greater than the property B frame value of the preceding frame;

condition 2, where condition 2 is satisfied if the property C frame value of the current frame is less than the property A frame value of the current frame and the property A frame value of the current frame is less than the property B frame value of the current frame and the property C frame value of the preceding frame is less than the property A frame value of the preceding frame and the property A frame value of the preceding frame is less than the property B frame value of the preceding frame;

condition 3, where condition 3 is satisfied if the property E frame value of the preceding frame is greater than the property A frame value of the preceding frame and the property A frame value of the preceding frame is greater than the property D frame value of the preceding frame and the property E frame value of the current frame is greater than the property A frame value of the current frame and the property A frame value of the current frame is greater than the property D frame value of the current frame; and condition 4, where condition 4 is satisfied if the property E frame value of the preceding frame is less than the property A frame value of the preceding frame and the property A frame value of the preceding frame is less than the property D frame value of the preceding frame and the property E frame value of the current frame is less than the property A frame value of the current frame and the property A frame value of the current frame is less than the property D frame value of the current frame;

and wherein:

if condition 1 is satisfied, the current frame is designated as an end frame of a fade with a decreasing frame value;

if condition 2 is satisfied, the current frame is designated as an end frame of a fade with an increasing frame value;

if condition 3 is satisfied, the immediately preceding frame is designated as a start frame of a fade with an increasing frame value; and if condition 4 is satisfied, the immediately preceding frame is designated as a start frame of a fade with a decreasing frame value.

EEE57. The method according to Enumerated Example Embodiment 49, further comprising:

selecting another frame from the plurality of frames;
designating the selected frame as the current frame
repeating Steps C through E;
comparing results from Step E for the preceding current frame with the present current frame to determine if results are compatible; and
determining whether a fade is a fade in or fade out or cross fade based on one or more frame values.

EEE58. The method according to Enumerated Example Embodiment 55, wherein the frame value of a frame comprises a value of a DC of an entire frame for one or more color space components.

EEE59. The method according to Enumerated Example Embodiment 55, wherein the frame value of a frame comprises a value of a DC of a specified portion or portions of a frame for one or more color space components.

EEE60. The method according to Enumerated Example Embodiment 55, wherein the frame value of a frame comprises a histogram of a frame for one or more color space components.

EEE61. The method according to Enumerated Example Embodiment 55, wherein the frame value of a frame comprises a histogram of a specified portion or portions of a frame for one or more color space components.

EEE62. The method according to Enumerated Example Embodiment 55, wherein frame m−1 immediately precedes frame m, frame m−2 immediately precedes frame m−1, frame m+1 immediately follows frame m, and frame m+2 immediately follows frame m+1.

EEE63. The method according to Enumerated Example Embodiment 55, wherein frame m−1 designates any frame temporally preceding frame m, frame m−2 designates any frame temporally preceding frame m−1, frame m+1 designates any frame temporally following frame m, and frame m+2 designates any frame temporally following frame m+1.

EEE64. The method according to Enumerated Example Embodiment 63, wherein temporal selection of any one of frames m−1, m−2, m+1, m+2 is variable.

EEE65. The method according to Enumerated Example Embodiment 64, wherein temporal selection varies dependent upon frame content.

EEE66. The method according to Enumerated Example Embodiment 54, wherein the color space components comprise intensity related and color related components and the set of properties are only computed for the luma component of each frame.

EEE67. The method according to Enumerated Example Embodiment 66, wherein the intensity related components comprise one or more of a luma value or a luminance value.

EEE68. The method according to Enumerated Example Embodiment 66, wherein the color related components comprise one or more of a chroma value or a chrominance value.

EEE69. The method according to Enumerated Example Embodiment 54, further comprising performing Steps C, D, and E for all color space components.

EEE70. The method according to Enumerated Example Embodiment 54, further comprising:
performing Steps C, D, and E for a first selected set of color space components, and
terminating after Step E if a determination of a fade condition is made based on testing only the first selected set of color space components.

EEE71. A method for crossfade detection comprising:
providing a plurality of frames of a video sequence and related bi-directional prediction reference frames; and
determining whether a cross fade is present based on average gains computed for color space components of a first color domain of a current frame and related bi-directional prediction reference frames and average gains computed for color space components of a second color domain of a current frame and related bi-directional prediction reference frames.

EEE72. The method according to Enumerated Example Embodiment 71, wherein determining whether a cross fade is present comprises:
calculating average values of color space components of the first color domain of the current frame and average values of color space components of the first color domain of the related bi-directional prediction reference frames;
calculating average values of color space components of the second color domain of a current frame and average values of color space components of the second color domain of the related bi-directional prediction reference frames;
determining if each of conditions 1 to 6 are satisfied:
Condition 1: if average gains for each bi-directional prediction reference frame for the first color space domain sum to unity or nearly unity;
Condition 2: if average gains for each bi-directional prediction reference frame for the second color space domain sum to unity or nearly unity
Condition 3: if magnitudes of average gains for each bi-directional prediction reference frame for the first color space domain are inversely proportional to distances of bi-directional prediction reference frames from current frame;
Condition 4: if magnitudes of average gains for each bi-directional prediction reference frame for the second color space domain are inversely proportional to distances of bi-directional prediction reference frames from current frame;
Condition 5: if average gains of the first color space domain provide a correct model of a cross fade in the first color space domain;
Condition 6: if average gains of the second color space domain provide a correct model of a cross fade in the second color space domain,
wherein if all of Conditions 1 to 6 are satisfied, a cross fade is determined to be present.

EEE73. The method according to Enumerated Example Embodiment 72, wherein the first color space domain is the RGB domain and the second color space domain is the YCbCr domain and wherein determining whether Conditions 5 and 6 are satisfied comprises determining whether the following equalities are satisfied:

$$\begin{bmatrix} R_m \\ G_m \\ B_m \end{bmatrix} = w_1 \times \begin{bmatrix} R_1 \\ G_1 \\ B_1 \end{bmatrix} + w_2 \times \begin{bmatrix} R_2 \\ G_2 \\ B_2 \end{bmatrix}$$

$$\begin{bmatrix} Y'_m \\ Cb_m \\ Cr_m \end{bmatrix} = w_1 \times \begin{bmatrix} Y'_1 \\ Cb_1 \\ Cr_1 \end{bmatrix} + w_2 \times \begin{bmatrix} Y'_2 \\ Cb_2 \\ Cr_2 \end{bmatrix}$$

where $$\begin{bmatrix} R_m \\ G_m \\ B_m \end{bmatrix}$$

designates a vector for the current frame in the RGB domain, $$\begin{bmatrix} R_1 \\ G_1 \\ B_1 \end{bmatrix} \text{ and } \begin{bmatrix} R_2 \\ G_2 \\ B_2 \end{bmatrix}$$

designate vectors for the bi-directional reference frames in the RGB domain, $$\begin{bmatrix} Y'_m \\ Cb_m \\ Cr_m \end{bmatrix}$$

designates a vector for the current frame in the YCbCr domain, $$\begin{bmatrix} Y'_1 \\ Cb_1 \\ Cr_1 \end{bmatrix} \text{ and } \begin{bmatrix} Y'_2 \\ Cb_2 \\ Cr_2 \end{bmatrix}$$

designate vectors for the bi-directional reference frames in the YCbCr domain, $w_1$ and $w_2$ designate the average gains.

EEE74. The method according to Enumerated Example Embodiment 71, the method further comprising setting chroma component gains equal to luma component gains if a cross fade is present.

EEE75. A method for weighted parameter determination in the presence of fade conditions, the method comprising the following steps:

Step A: providing a plurality of frames of a picture and related prediction reference frames;

Step B: selecting a color component;

Step C: for each frame and related prediction reference frame, determining saturated partitions for the selected color component within the frame and its related prediction reference frame;

Step D: for each frame and related prediction reference frame, determining if both frames share large areas with saturated values for the selected color component, if there are no shared large areas with saturated values, go to Step H;

Step E: for each frame and related prediction reference frame, determining unsaturated partitions within the frame and its related prediction reference frame;

Step F: for each frame and related prediction reference frame, determining if both frames share large areas with unsaturated values for the selected color component; if there are no shared large areas with unsaturated values go to Step H;

Step G: for each frame and related prediction frame, calculating weighted prediction gains and factors based on the shared, and optionally normalized to the same pixel count, large areas with unsaturated values; and Step H: for each frame and related prediction reference frame, calculating weighted prediction gains and factors based on the entire frame.

EEE76. The method according to Enumerated Example Embodiment 75, further comprising selecting another color component and repeating Steps C through H for that selected color component.

EEE77. The method according to Enumerated Example Embodiment 75, wherein calculating weighted prediction gains and factors is based on weighted prediction gains and factors for a previous frame.

EEE78. The method according to Enumerated Example Embodiment 75, wherein each frame and related prediction frame are segmented and Step A through Step H are performed on one or more segments of each frame and related prediction frame and weighted prediction gains and factors are computed for each segment.

EEE79. The method according to Enumerated Example Embodiment 78, wherein motion compensation tracks segments from one frame to another frame.

EEE80. A method for weighted parameter determination in the presence of fade conditions, the method comprising the following steps:

Step A: providing a plurality of frames of a picture and related prediction reference frames containing color sample data;

Step B: selecting a color component;

Step C: for each frame, setting a current lowest saturation value and current highest saturation value for the selected color component based on a selected color domain for the color sample data;

Step D: for each related prediction reference frame, setting a current reference lowest saturation value and a current reference highest saturation value for the selected color component based on the selected color domain for the color sample data;

Step E: for each frame and related prediction reference frame, estimating weighted prediction parameters based on the current lowest saturation value, the current highest saturation value, the current reference lowest saturation value, and the current reference highest saturation value;

Step F: for each related prediction reference frame, calculating an updated current reference lowest saturation value and an updated current reference highest saturation value based on estimated weighted prediction parameters;

Step G: setting the current reference lowest saturation value equal to updated current reference lowest saturation value and setting the current reference highest saturation value equal to the updated current reference highest saturation value; and Step H: repeating steps D through G for successive iterations if the weighted prediction parameters for a present iteration differ from the weighted prediction parameters for an immediately preceding iteration by a selected value or if a number of iterations are greater than a selected iteration count.

EEE81. The method according to Enumerated Example Embodiment 80, wherein the weighted prediction parameters for an iteration t comprise a weighted gain $w_t$ and a factor $f_t$ and the updated current reference lowest saturation value and updated current reference highest saturation value are computed according to the following formulas:

$$l_{s,t+1}^{n+k} = \frac{l_{s,0}^n - f_t}{w_t} + 1$$

$$h_{s,t+1}^{n+k} = \frac{h_{s,0}^n - f_t}{w_t} - 1$$

where $l_{s,0}^n$ is the current lowest saturation value, $h_{s,0}^n$ is the current highest saturation value, $l_{s,t+1}^{n+k}$ the updated current reference lowest saturation value, and $h_{s,t+1}^{n+k}$ is the updated current reference highest saturation value EEE82. The method according to Enumerated Example Embodiment 81, further calculating histograms of the frame and the related prediction reference frame prior to estimating weighted prediction parameters, wherein estimation of the weighted prediction parameters is based on the computed histograms.

EEE83. The method according to Enumerated Example Embodiment 81, further comprising selecting another color component and repeating Steps C through H for that selected color component.

EEE84. The method according to Enumerated Example Embodiment 81, wherein estimating weighted prediction parameters is based on weighted prediction parameters estimated for the immediately preceding iteration.

EEE85. The method according to Enumerated Example Embodiment 80, wherein each frame and related prediction frame are segmented and Step C through Step H are performed on one or more segments of each frame and related prediction reference frame.

EEE86. The method according to Enumerated Example Embodiment 84, wherein calculating an updated current reference lowest saturation value and an updated current reference highest saturation value based on estimated weighted prediction parameters comprises calculating an updated current reference lowest saturation value and an updated current reference highest saturation value to provide that no pixel values are saturated or clipped as a result of weighted prediction.

EEE87. The method according to Enumerated Example Embodiment 84, wherein the selected color domain comprises an initial color space.

EEE88. The method according to Enumerated Example Embodiment 84, wherein the selected color domain comprises a second color domain derived from a conversion from a first color domain, and wherein the estimated weighted prediction parameters comprise weighted prediction parameters in the first color domain.

EEE89. The method according to Enumerated Example Embodiment 84, wherein a plurality of color domains are derived from a conversion from a first color domain and the selected color domain comprises selecting each one of the plurality of color domains and wherein estimated weighted prediction parameters are based on each of the selected color domains.

EEE90. A method for estimating weighted predication gains and offsets in a fade transition from one picture to a next picture of a video signal, the method comprising:

providing a current frame and a related prediction reference frame from pictures within the video signal;

for each current frame and related prediction reference frame; calculating color component values in a color domain, wherein $A_m$ designates a first color component for the current frame, $B_m$ esignates a second color component for the current frame, $C_m$ designates a third color component for the current frame, and wherein $A_{m+1}$ designates a first color component for the related prediction reference frame, $B_{m+1}$ designates a second color component for the related prediction reference frame, $C_{m+1}$ designates a third color component for the related prediction reference frame;

setting weighted prediction gains equal for all color components, wherein w designates an equal value weighted prediction gain for all color components;

setting weighted prediction offsets equal to each other, wherein $f_A$ designates an offset for the first color component and $f_C$ designates an equal value weighted prediction offset for two of the color components;

solving the following formula for weighted prediction gain w and weighted prediction offsets $f_A$ and $f_C$:

$$\begin{bmatrix} A_m \\ B_m \\ C_m \end{bmatrix} = w \times \begin{bmatrix} A_{m+k} \\ B_{m+k} \\ C_{m+k} \end{bmatrix} + \begin{bmatrix} f_A \\ f_C \\ f_C \end{bmatrix}$$

EEE91. The method of Enumerated Example Embodiment 90, wherein the color domain is the YCbCr domain, and the weighted prediction offsets for two of the color components set equal to each other comprise weighted prediction offsets for chroma color components.

EEE92. The method of Enumerated Example Embodiment 90, wherein color component values are computed for one or more segments of the current frame and related prediction reference frame.

EEE93. A method for estimating weighted predication gains and offsets in a fade transition from one picture to a next picture of a video signal, the method comprising:

providing a current frame and a related prediction reference frame from pictures within the video signal;

for each current frame and related prediction reference frame; calculating color component values in a color domain, wherein $A_m$ designates a first color component for the current frame, $B_m$ designates a second color component for the current frame, $C_m$ designates a third color component for the current frame, and wherein $A_{m+1}$ designates a first color component for the related prediction reference frame, $B_{m+1}$ designates a second color component for the related prediction reference frame, $C_{m+1}$ designates a third color component for the related prediction reference frame;

setting weighted prediction offsets equal for all color components, wherein f designates an equal value weighted prediction offset for all color components;

setting weighted prediction gains for two of the color components equal to each other, wherein $w_A$ designates an offset for the first color component and $w_C$ designates an equal value weighted prediction offset for two of the color components;

solving the following formula for weighted prediction gains $w_A$ and $w_C$ and weighted prediction offset f:

$$\begin{bmatrix} A_m \\ B_m \\ C_m \end{bmatrix} = \begin{bmatrix} w \times A_{m+k} \\ w \times B_{m+k} \\ w \times C_{m+k} \end{bmatrix} + \begin{bmatrix} f \\ f \\ f \end{bmatrix}$$

EEE94. The method of Enumerated Example Embodiment 93, wherein the color domain is the RGB domain, and the weighted prediction gains for two of the color components set equal to each other comprise weighted prediction offsets for green and blue components.

EEE95. The method of Enumerated Example Embodiment 93, wherein the color domain is the RGB domain, and the weighted prediction gains for two of the color components set equal to each other comprise weighted prediction offsets for red and blue components.

EEE96. The method of Enumerated Example Embodiment 93, wherein color component values are computed for one or more segments of the current frame and related prediction reference frame.

EEE97. A method for converting weighted prediction parameters from a first color domain to a second color domain, wherein a conversion from the first color domain to the second domain is not linear, the method comprising:

calculating second color domain weighted prediction parameters for one or more frames in the second domain based on a conversion expression from the first color domain to the second color domain.

EEE98. The method according to Enumerated Example Embodiment 97, wherein conversion of weighted prediction parameters occurs in the presence of an image transition.

EEE99. The method according to Enumerated Example Embodiment 97, wherein the conversion expression from the first color domain to the second color domain comprises an exponential conversion, the method further comprising:

calculating first color domain weighted prediction parameters for one or more frames in the first color domain to obtain a first color domain gain value, and wherein calculating second color domain weighted prediction parameters comprises calculating a second color domain gain value equal to the first color domain gain value raised to the power of the exponent in the exponential conversion.

EEE100. The method according to Enumerated Example Embodiment 99, wherein conversion of weighted prediction parameters occurs in the presence of an image fade.

EEE101. The method according to Enumerated Example Embodiment 99, wherein the exponential conversion comprises a gamma correction wherein $\gamma$ designates the exponent, the first color domain value is designated as w, and the second color domain value is equal to $w^\gamma$.

EEE102. The method according to Enumerated Example Embodiment 97, wherein the conversion expression from the first color domain to the second color domain comprises a log-space conversion expression, and the image transition comprises a fade, the method further comprising:

calculating first color domain weighted prediction parameters for one or more frames in the first color domain to obtain a first color domain gain value, and wherein calculating second color domain weighted prediction parameters comprises calculating a second color domain offset value equal to the logarithm of the first color domain gain value.

EEE103. The method according to Enumerated Example Embodiment 98, wherein the conversion expression from the first color domain to the second color domain comprises an exponential conversion, and the image transition comprises a fade and wherein calculating second color domain weighted prediction parameters comprises calculating a second color domain gain value not equal to unity and a second color domain offset value equal to zero.

EEE104. The method according to Enumerated Example Embodiment 98, where wherein the conversion expression from the first color domain to the second color domain comprises a log-space conversion expression, and the image transition comprises a fade, and wherein calculating second color domain weighted prediction parameters comprises calculating a second color domain gain value equal to unity and a second color domain offset value not zero.

EEE105. The method according to Enumerated Example Embodiment 97, wherein the image transition comprises a cross fade and the conversion expression from the first color domain to the second color domain comprises an exponential conversion, and the method further comprises:

calculating first color domain weighted prediction parameters comprising a first reference gain value for a first reference frame and a second reference gain value for a second reference frame, and wherein calculating second color domain weighted prediction parameters comprises calculating second color domain gain values based on the first reference gain value and the second reference gain value.

EEE106. The method according to Enumerated Example Embodiment 105, wherein calculating second color domain weighted prediction parameters comprises solving two binomial expansions based on the first reference gain value and one or more first reference frame value and the second reference gain value and one or more second reference frame values.

EEE107. The method according to Enumerated Example Embodiment 97, wherein the image transition comprises a cross fade and the conversion expression from the first color domain to the second color domain comprises a log-space conversion, and the method further comprises:

calculating first color domain weighted prediction parameters comprising a first reference gain value for a first reference frame and a second reference gain value for a second reference frame; and wherein calculating second color domain weighted prediction parameters comprises calculating second color domain gain values based on the first reference frame gain value and the second reference gain value.

EEE108. The method according to Enumerated Example Embodiment 107, wherein offsets in the second color domain weighted parameters are set equal to logarithms of the first reference gain value and the second reference gain value.

EEE109. The method according to Enumerated Example Embodiment 97, further comprising:

compressing content into a first layer using the first color domain, and compressing content into a second layer using the second color domain, whereby weighted prediction parameters computed for the first layer are converted into weighted prediction parameters for the second layer.

EEE110. The method according to Enumerated Example Embodiment 109, wherein the first layer comprises a base layer and the second layer comprises an enhancement layer.

EEE111. The method according to Enumerated Example Embodiment 110, wherein the weighted prediction parameters for the first layer are transmitted to a decoder or encoder for the second layer.

EEE112. An encoder for encoding a video signal according to the method recited in one or more of Enumerated Example Embodiments 1 to 111, inclusive.

EEE113. An apparatus for encoding a video signal according to the method recited in one or more of Enumerated Example Embodiments 1 to 111, inclusive.

EEE114. A system for encoding a video signal according to the method recited in one or more of Enumerated Example Embodiments 1 to 111, inclusive.

EEE115. A decoder for decoding a video signal according to the method recited in one or more of Enumerated Example Embodiments 1 to 111, inclusive.

EEE116. The decoder according to Enumerated Example Embodiment 115, wherein weighted prediction parameters are not conveyed to the decoder and wherein the weighted prediction parameters are derived from picture information sent to the decoder.

EEE117. An apparatus for decoding a video signal according to the method recited in one or more of Enumerated Example Embodiments 1 to 111, inclusive.

EEE118. The apparatus according to Enumerated Example Embodiment 117, wherein weighted prediction parameters are not conveyed to the apparatus and wherein the weighted prediction parameters are derived from picture information sent to the apparatus.

EEE119. A system for decoding a video signal according to the method recited in one or more of Enumerated Example Embodiments 1 to 111, inclusive.

EEE120. The system according to Enumerated Example Embodiment 119, wherein weighted prediction parameters are not conveyed to the system and wherein the weighted prediction parameters are derived from picture information sent to the system.

EEE121. A computer-readable medium containing a set of instructions that causes a computer to perform the method recited in one or more of Enumerated Example Embodiments 1 to 111, inclusive.

EEE122. Use of the method recited in one or more of Enumerated Example Embodiments 1 to 111, inclusive, to encode a video signal.

EEE123. Use of the method recited in one or more of Enumerated Example Embodiments 1 to 111, inclusive, to decode a video signal.

EEE124. A computer-readable storage medium comprising a set of instructions that causes, controls, programs or configures one or more of a computer or an integrated circuit (IC) device to perform the method recited in one or more of Enumerated Example Embodiments 1 to 111, inclusive.

EEE125. An IC device that is configured, programmed, controlled or designed to perform a process as recited in one or more of Enumerated Example Embodiments 1 to 111, inclusive.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the enhancement methods for sampled and multiplexed image and video data of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the claims, which follow the List of References, below.

LIST OF REFERENCES

[1] Ford and A. Roberts, "Color Space Conversions", http://www.poynton.com/PDFs/coloureq.pdf.

[2] K. Kamikura, H. Watanabe, H. Jozawa, H. Kotera, and S. Ichinose, "Global Brightness-Variation Compensation for Video Coding," IEEE Transactions on Circuits and Systems for Video Technology, vol. 8, no. 8, Wavelet Applications in Industrial Processing, December 1998, pp. 988-1000.

[3] Y. Kikuchi and T. Chujoh, "Interpolation coefficient adaptation in multi-frame interpolative prediction", Joint Video Team of ISO/IEC MPEG and ITU-T VCEG, JVT-C103, March 2002.

[4] H. Kato and Y. Nakajima, "Weighting factor determination algorithm for H.264/MPEG-4 AVC weighted prediction," Proc. IEEE 6th Workshop on Multimedia Signal Proc., Siena, Italy, October 2004.

[5] J. M. Boyce, "Weighted prediction in the H.264/MPEG-4 AVC video coding standard," Proc. IEEE International Symposium on Circuits and Systems, Vancouver, Canada, May 2004, vol. 3, pp. 789-792.

[6] P. Yin, A. M. Tourapis, and J. M. Boyce, "Localized weighted prediction for video coding," Proc. IEEE International Symposium on Circuits and Systems, May 2005, vol. 5, pp. 4365-4368.

Furthermore, all patents and publications that are mentioned in the specification may be indicative of the levels of skill of those skilled in the art to which the disclosure pertains. All references cited in this disclosure are incorporated by reference to the same extent as if each reference had been incorporated by reference in its entirety individually.

What is claimed is:

1. A method for fade detection and determination of global or local nature of the fade in a transition from one picture to a next picture of a video signal, the method comprising:

providing a plurality of frames of a picture and related prediction reference frames;

for each frame and related prediction reference frame; calculating or obtaining one or more intensity related values and one or more color related values in a first color domain, wherein the calculated one or more intensity related values and the one or more color related values comprise color components;

for each frame and related prediction reference frame, calculating weighted prediction gains for each calculated color component value in the first color domain;

if the weighted prediction gains are all non-negative and substantially similar to each other, then determining that a global transition with zero offset is occurring in a second color domain, wherein the weighted prediction pains are substantially similar to each other if the gains are within a threshold of 5% to 10% of each other; and, if the weighted prediction gains are not all non-negative and substantially similar to each other, then determining that at least one of the following is not occurring: a global fading transition; a global fading transition with zero offset; or a global fading transition with zero offset in the second color domain.

2. The method of claim 1, wherein the intensity related values comprise one or more of a luma value or a luminance value.

3. The method of claim 1, wherein the color related values comprise one or more of a chroma value or a chrominance value.

4. The method of claim 1, wherein the first color domain comprises the YCbCr domain and the weighted prediction gains are computed with values that comprise:

luma components of a frame and a prediction reference frame of the frame;

chroma component values of the frame;

chroma component values of the prediction reference frame of the frame, and color format conversion offset values.

5. The method of claim 1, wherein the intensity related and color related values comprise average intensity related and color related values.

6. The method of claim 1, wherein the intensity related and color related values are computed from histogram information.

7. The method of claim 1, wherein the plurality of frames comprise part of a frame sequence.

8. The method of claim 1, wherein the plurality of frames comprise part of a set of frames indicated to have illumination changes.

9. The method of claim 1, wherein a color space matrix defining a transition from the first color domain to the second color domain is linear.

10. A method for fade detection and determination of global or local nature of the fade in a transition from one picture to a next picture of a video signal, the method comprising:
providing a plurality of frames of a picture and related prediction reference frames;
for each frame and related prediction reference frame; calculating or obtaining one or more intensity related values and one or more color related values in a first color domain, wherein the calculated one or more intensity related values and the one or more color related values comprise color components;
for each frame and related prediction reference frame, calculating weighted prediction gains for each calculated color component value in the first color domain;
if the weighted prediction gains are all non-negative and substantially similar to each other, then determining that a global transition with zero offset is occurring in a second color domain;
if the weighted prediction gains are not all non-negative and substantially similar to each other, then determining that at least one of the following is not occurring: a global fading transition; a global fading transition with zero offset; or a global fading transition with zero offset in the second color domain; and
logarithmically scaling the weighted prediction gains are to have values between 0 and 1, and determining whether the gains are substantially similar by calculating whether differences between the weighted prediction gains values are less than a threshold value up to 0.1.

11. A method for fade detection and determination of global or local nature of the fade in a transition from one picture to a next picture of a video signal, the method comprising:
providing a plurality of frames of a picture and related prediction reference frames;
for each frame and related prediction reference frame; calculating intensity related and color related values in a first color domain;
for each frame and related prediction reference frame; calculating intensity related weighted prediction parameters;
for each frame and related prediction reference frame, calculating weighted prediction gains from calculated intensity related and color related values and from calculated intensity related weighted prediction parameters;
if the weighted prediction gains are all non-negative and substantially similar to each other, then determining that a global transition with zero offset is primarily occurring in a second color domain, wherein the weighted prediction gains are substantially similar to each other if the gains are within a threshold of 5% to 10% of each other; and,
if the weighted prediction gains are not all non-negative and substantially similar to each other, then testing to determine if a local transition is occurring.

12. A method for determination of global or local nature of a fade in a transition from a picture to a next picture of a video signal, the method comprising:
providing a plurality of frames of the picture and related prediction reference frames;
for each frame and related prediction reference frame, calculating intensity related and color related values in a first color domain;
for each frame and related prediction reference frame, calculating weighted prediction gains for each intensity related and color related value in the first color domain;
for each frame and related prediction reference frame, comparing the weighted prediction gains with each other;
if the weighted prediction gains are all non-negative and substantially similar to each other, then determining that the fade is global, wherein the weighted prediction gains are substantially similar to each other if the gains are within a threshold of 5% to 10% of each other; and
if the weighted prediction gains are not all non-negative and substantially similar to each other, then determining that the fade is local.

* * * * *